US006535214B1

(12) United States Patent
Morikawa et al.

(10) Patent No.: US 6,535,214 B1
(45) Date of Patent: Mar. 18, 2003

(54) SEMICONDUCTOR DEVICE FOR DISPLAY CONTROL

(75) Inventors: Yoshinao Morikawa, Nara (JP); Junichi Tanimoto, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/534,128

(22) Filed: Mar. 23, 2000

(30) Foreign Application Priority Data

Mar. 29, 1999 (JP) .......................................... 11-086312

(51) Int. Cl.[7] ................................................ G06T 11/00

(52) U.S. Cl. ....................... 345/467; 345/581; 345/619; 345/670; 345/671; 340/724

(58) Field of Search ................................ 345/581, 467, 345/670, 671, 619; 340/724

(56) References Cited

U.S. PATENT DOCUMENTS 4,837,564 A * 6/1989 Ogawa et al. .............. 345/471
5,227,772 A * 7/1993 Takebe ....................... 345/157
5,233,334 A * 8/1993 Takebe et al. .............. 345/471
5,852,447 A * 12/1998 Hosoya et al. .............. 345/441
5,873,109 A * 2/1999 High .......................... 707/507
6,115,024 A * 9/2000 Ayama ........................ 345/23

FOREIGN PATENT DOCUMENTS

JP A4294418 10/1992

* cited by examiner

*Primary Examiner*—Matthew C. Bella
*Assistant Examiner*—Mike Rahmjoo
(74) *Attorney, Agent, or Firm*—Birch, Stewart, Kolasch & Birch, LLP

(57) ABSTRACT

A semiconductor device for display control includes an input section for receiving a display information including a character code, a display position information and a character size information, a first address generating section for generating a first address group corresponding to the received character code by applying a predetermined conversion rule to the received character code and character size information, a font data storing section for outputting the font data stored in the region specified by the first address group when the first address group is given, a second address generating section for generating a second address group by utilizing the received display position information, the second address group representing a region where the font data is to be expanded, a font data expanding section for expanding and temporarily storing the font data in the region represented by the second address group, and an output section for outputting the font data to an external display driving unit.

9 Claims, 26 Drawing Sheets

FIG.6

(1) IN CASE OF JIS CODE (a) JIS CODE CONVERSION TABLE

① CONVERSION TABLE OF JIS CODE FIRST BYTE = 21H TO 28H , 70H TO 74H

| JIS CODE | FIRST BYTE | | | | | | | SECOND BYTE | | | | | | |
|---|---|---|---|---|---|---|---|---|---|---|---|---|---|---|
| | b17 | b16 | b15 | b14 | b13 | b12 | b11 | b27 | b26 | b25 | b24 | b23 | b22 | b21 |
| CONVERSION CODE | HB13 | | | | HB10 | HB9 | HB8 | HB12 | HB11 | HB5 | HB4 | HB3 | HB2 | HB1 |

HB14=HB7=HB6=0

② CONVERSION TABLE OF JIS CODE FIRST BYTE = 30H TO 4FH

| JIS CODE | FIRST BYTE | | | | | | | SECOND BYTE | | | | | | |
|---|---|---|---|---|---|---|---|---|---|---|---|---|---|---|
| | b17 | b16 | b15 | b14 | b13 | b12 | b11 | b27 | b26 | b25 | b24 | b23 | b22 | b21 |
| CONVERSION CODE | HB12 | | | HB11 | HB10 | HB9 | HB8 | HB7 | HB6 | HB5 | HB4 | HB3 | HB2 | HB1 |

HB14=HB13=0

③ CONVERSION TABLE OF JIS CODE FIRST BYTE = 50H

| JIS CODE | FIRST BYTE | | | | | | | SECOND BYTE | | | | | | |
|---|---|---|---|---|---|---|---|---|---|---|---|---|---|---|
| | b17 | b16 | b15 | b14 | b13 | b12 | b11 | b27 | b26 | b25 | b24 | b23 | b22 | b21 |
| CONVERSION CODE | | HB12 | | HB11 | HB10 | HB9 | HB8 | HB7 | HB6 | HB5 | HB4 | HB3 | HB2 | HB1 |

HB14=0,HB13=1

(b) ADDRESS CONVERSION EXPRESSION

| | 2-BYTE VALUE | | | | | | | | | | | | | | | |
|---|---|---|---|---|---|---|---|---|---|---|---|---|---|---|---|---|
| CONVERSION CODE VALUE | 0 | 0 | HB14 | HB13 | HB12 | HB11 | HB10 | HB9 | HB8 | HB7 | HB6 | HB5 | HB4 | HB3 | HB2 | HB1 |

RANGE OF CONVERSION CODE VALUE : 0000~3FFFFH

FONT STORAGE ROM ADDRESS HEAD = CONVERSION CODE VALUE × SIZE OF FONT CHARACTER

FIG.7

(2) IN CASE OF SHIFT JIS CODE (a) SHIFT JIS CODE CONVERSION TABLE

① CONVERSION TABLE OF SHIFT JIS CODE FIRST BYTE= 88H TO 9FH ,EOH TO E7H AND SECOND BYTE = 40H TO 7EH , 80H TO FCH

| SJIS CODE | FIRST BYTE | | | | | | | | SECOND BYTE | | | | | | | |
|---|---|---|---|---|---|---|---|---|---|---|---|---|---|---|---|---|
| | b18 | b17 | b16 | b15 | b14 | b13 | b12 | b11 | b28 | b27 | b26 | b25 | b24 | b23 | b22 | b21 |
| CONVERSION CODE | | | | HB12 | HB11 | HB10 | HB9 | HB8 | HB13 | HB7 | HB6 | HB5 | HB4 | HB3 | HB2 | HB1 |

HB14=0

② CONVERSION TABLE OF SHIFT JIS CODE FIRST BYTE= 81H TO 84H ,E8H TO EAH AND SECOND BYTE = 40H TO 7EH , 80H TO FCH

| SJIS CODE | FIRST BYTE | | | | | | | | SECOND BYTE | | | | | | | |
|---|---|---|---|---|---|---|---|---|---|---|---|---|---|---|---|---|
| | b18 | b17 | b16 | b15 | b14 | b13 | b12 | b11 | b28 | b27 | b26 | b25 | b24 | b23 | b22 | b21 |
| CONVERSION CODE | | | | | HB12 | | HB9 | HB8 | HB11 | HB10 | HB6 | HB5 | HB4 | HB3 | HB2 | HB1 |

HB14=HB13=HB7=0

(b) ADDRESS CONVERSION EXPRESSION

| | 2 - BYTE VALUE | | | | | | | | | | | | | | | |
|---|---|---|---|---|---|---|---|---|---|---|---|---|---|---|---|---|
| CONVERSION CODE VALUE | 0 | 0 | HB14 | HB13 | HB12 | HB11 | HB10 | HB9 | HB8 | HB7 | HB6 | HB5 | HB4 | HB3 | HB2 | HB1 |

RANGE OF CONVERSION CODE VALUE : 0000~3FFFFH

FONT STORAGE ROM ADDRESS HEAD =CONVERSION CODE VALUE × SIZE OF FONT CHARACTER

FIG.9

| | SYMBOL | NAME OF TERMINAL | INPUT/ OUTPUT KIND |
|---|---|---|---|
| (1) | D0-D7 | LIQUID CRYSTAL DRIVER OUTPUT, 8-BIT BIDIRECTIONAL BUS TERMINAL | (I/O) |
| (2) | FMA | LIQUID CRYSTAL DRIVER SIGNAL INPUT SWITCHING TERMINAL | (I) |
| (3) | FMRT | SIGNAL INPUT LATCH TIMING TERMINAL | (I) |
| (4) | FMCS | CHIP SELECT SIGNAL INPUT TERMINAL | (I) |
| (5) | FMBUSY | SIGNAL INPUT ENABLE SIGNAL OUTPUT TERMINAL | (O) |
| (6) | RESB | RESET SIGNAL INPUT TERMINAL FOR LIQUID CRYSTAL DRIVER | (I) |
| (7) | CSB | CHIP SELECT SIGNAL INPUT TERMINAL FOR LIQUID CRYSTAL DRIVER | (I) |
| (8) | RS | COMMAND DATA IDENTIFICATION SIGNAL TERMINAL FOR LIQUID CRYSTAL DRIVER | (I) |
| (9) | WRB | FETCHING TIMING SIGNAL TERMINAL FOR LIQUID CRYSTAL DRIVER DATA | (I) |
| (10) | RDB | READING TIMING SIGNAL TERMINAL FOR LIQUID CRYSTAL DRIVER DATA | (I) |
| | VCC | POWER TERMINAL FOR SEMICONDUCTOR DEVICE | |
| | GND | TERMINAL FOR SEMICONDUCTOR DEVICE | |

FIG.10

| COMMEND NUMBER | CONTENTS | NUMBER OF NECESSARY BITS | D7 | D6 | D5 | D4 | D3 | D2 | D1 | D0 |
|---|---|---|---|---|---|---|---|---|---|---|
| 0 | X ADDRESS (LOW ORDER) | 4 BITS | 0 | 0 | 0 | 0 | X3 | X2 | X1 | X0 |
| 1 | X ADDRESS (HIGH ORDER) | 3 BITS | 0 | 0 | 0 | 1 | | X6 | X5 | X4 |

X-DIRECTION ADDRESS RANGE : 0~4F

| COMMEND NUMBER | CONTENTS | NUMBER OF NECESSARY BITS | D7 | D6 | D5 | D4 | D3 | D2 | D1 | D0 |
|---|---|---|---|---|---|---|---|---|---|---|
| 2 | Y ADDRESS (LOW ORDER) | 4 BITS | 0 | 0 | 1 | 0 | Y3 | Y2 | Y1 | Y0 |
| 3 | Y ADDRESS (HIGH ORDER) | 2 BITS | 0 | 0 | 1 | 1 | | | Y5 | Y4 |

Y-DIRECTION ADDRESS RANGE : 0~3F

| COMMEND NUMBER | CONTENTS | NUMBER OF NECESSARY BITS | D7 | D6 | D5 | D4 | D3 | D2 | D1 | D0 |
|---|---|---|---|---|---|---|---|---|---|---|
| 4 | KANJI CODE<br>FONT SIZE<br>INVERSION<br>X-DIRECTION INCREMENT | 4+8+8 BITS | 0 | 1 | 0 | 0 | P | R | S1 | S2 |
| | | | K7 | K6 | K5 | K4 | K3 | K2 | K1 | K0 |
| | | | K15 | K14 | K13 | K12 | K11 | K10 | K9 | K8 |

P : X-DIRECTION INCREMONT SETTING (XINC)
R : BLACK-AND-WHITE DISPLAY INVERSION SETTING (REVERSE)
S1,S2 : FONT SIZE SETTING (SIZE)
K0-K15 : KANJI CODE

| COMMEND NUMBER | CONTENTS | NUMBER OF NECESSARY BITS | D7 | D6 | D5 | D4 | D3 | D2 | D1 | D0 |
|---|---|---|---|---|---|---|---|---|---|---|
| 5 | Y-DIRECTION INCREMENT | 2 BITS | 0 | 1 | 0 | 1 | | | Y12 | Y8 |

Y8 : Y-DIRECTION INCREMENT SETTING 8 DOTS (YINC8)
Y12 : Y-DIRECTION INCREMENT SETTING 12 DOTS (YINC12)

| COMMEND NUMBER | CONTENTS | NUMBER OF NECESSARY BITS | D7 | D6 | D5 | D4 | D3 | D2 | D1 | D0 |
|---|---|---|---|---|---|---|---|---|---|---|
| 6 | INPUT START/END | 2 BITS | 0 | 1 | 1 | 0 | | | E0 | S0 |

E0 : COMMAND INPUT START COMMAND (START)
S0 : COMMAND INPUT END COMMAND(END)

FIG.23
PRIOR ART (1) IN CASE OF JIS CODE (a) CONVERSION TABLE OF JIS CODE FIRST BYTE = 21H TO 28H , 70H TO 74H

| JIS CODE | FIRST BYTE | | | | | | | SECOND BYTE | | | | | | |
|---|---|---|---|---|---|---|---|---|---|---|---|---|---|---|
| | b17 | b16 | b15 | b14 | b13 | b12 | b11 | b27 | b26 | b25 | b24 | b23 | b22 | b21 |
| CHARACTER ADDRESS | A16 | | | | A13 | A12 | A11 | A15 | A14 | A8 | A7 | A6 | A5 | A4 |

A17=A10=A9=0

(b) CONVERSION TABLE OF JIS CODE FIRST BYTE = 30H TO 4HF

| JIS CODE | FIRST BYTE | | | | | | | SECOND BYTE | | | | | | |
|---|---|---|---|---|---|---|---|---|---|---|---|---|---|---|
| | b17 | b16 | b15 | b14 | b13 | b12 | b11 | b27 | b26 | b25 | b24 | b23 | b22 | b21 |
| CHARACTER ADDRESS | A15 | | | A14 | A13 | A12 | A11 | A10 | A9 | A8 | A7 | A6 | A5 | A4 |

A17=A16=0

(c) CONVERSION TABLE OF JIS CODE FIRST BYTE = 50H TO 6HF

| JIS CODE | FIRST BYTE | | | | | | | SECOND BYTE | | | | | | |
|---|---|---|---|---|---|---|---|---|---|---|---|---|---|---|
| | b17 | b16 | b15 | b14 | b13 | b12 | b11 | b27 | b26 | b25 | b24 | b23 | b22 | b21 |
| CHARACTER ADDRESS | | A15 | | A14 | A13 | A12 | A11 | A10 | A9 | A8 | A7 | A6 | A5 | A4 |

A17=0,A16=1

FIG.24
PRIOR ART (2) IN CASE OF SHIFT JIS CODE (a) CONVERSION TABLE OF SHIFT JIS CODE FIRST BYTE = 88H TO 9FH , EOH TO E7H AND SHIFT JIS CODE SECOND BYTE = 40H TO 7EH , 80H TO FCH

| SJISCODE | FIRST BYTE | | | | | | | | SECOND BYTE | | | | | | | |
|---|---|---|---|---|---|---|---|---|---|---|---|---|---|---|---|---|
| | b18 | b17 | b16 | b15 | b14 | b13 | b12 | b11 | B28 | b27 | b26 | b25 | b24 | b23 | b22 | b21 |
| CHARACTER ADDRESS | | | | A15 | A14 | A13 | A12 | A11 | A16 | A10 | A9 | A8 | A7 | A6 | A5 | A4 |

A17=0

(b) CONVERSION TABLE OF SHIFT JIS CODE FIRST BYTE = 81H TO 84H , E8H TO EAH AND SHIFT JIS CODE SECOND BYTE = 40H TO 7EH , 80H TO FCH

| SJISCODE | FIRST BYTE | | | | | | | | SECOND BYTE | | | | | | | |
|---|---|---|---|---|---|---|---|---|---|---|---|---|---|---|---|---|
| | b18 | b17 | b16 | b15 | b14 | b13 | b12 | b11 | B28 | b27 | b26 | b25 | b24 | b23 | b22 | b21 |
| CHARACTER ADDRESS | | | | | A15 | | A12 | A11 | A14 | A13 | A9 | A8 | A7 | A6 | A5 | A4 |

A17=A16=A10=0

SEMICONDUCTOR DEVICE FOR DISPLAY CONTROL

CROSS-REFERENCE TO RELATED APPLICATION

This application is related to Japanese Patent Application No. HEI 11(1999)-086312 filed on Mar. 29, 1999, whose priority is claimed under 35 USC §119, the disclosure of which is incorporated by reference in its entirety.

BACKGROUND OF THE INVENTION

1. Field of the Invention

The present invention relates to a semiconductor device for display control, and more particularly to a semiconductor device for display control for generating bit-mapped display data to be given to a liquid crystal driving device for displaying characters, graphics and the like on a liquid crystal display.

2. Description of the Related Art

FIG. 15 is a block diagram showing the structure of a device necessary for displaying characters and the like according to the prior art.

In general, the above-mentioned device comprises a liquid crystal display 101 for displaying characters and the like, a liquid crystal driving device 102 for controlling the display of characters and the like, a ROM 104 for font data storage in which font data is stored for each character, a RAM 103 for temporary storage of font data in which font data to be displayed is temporarily stored and a CPU 105.

An operation of displaying a character according to the prior art will be described below.

First of all, the CPU 105 operates to specify a character code to be displayed. In some cases, the character code is generated by a program processing or is prestored in a memory such as a RAM, a ROM or the like depending on the need. In general, the character code is defined for each character, and is defined as a shift JIS code or a JIS code in Japanese.

The CPU 105 utilizes special software to calculate a character storage address in the ROM 104 for font data storage in which font data corresponding to a specified character code is stored. In order to calculate the character storage address from the character code, a "character code-character storage address conversion table" shown in FIGS. 23 and 24 is used. For example, while the smallest character code of the JIS code is "2120" in a hexadecimal number, the smallest address of the ROM 104 for font data storage is "0". A corresponding relationship between the code and the address is described in the conversion table so that conversion from "2120" to "0" can be easily carried out.

FIG. 16 shows input and output terminals of the ROM 104 for font data storage. When addresses (A0 to A17) are input to the input terminal, corresponding font data is output to output terminals (D0 to D15).

FIG. 17 illustrates an example of the storage of font data of a 16-dot size character. A Chinese character (one element of Japanese writing system) 漢 shown in a size of 16×16 dots.

FIGS. 23 and 24 show a character code-character storage address conversion table in the ROM 104 for font data storage illustrated in FIG. 16.

The CPU 105 gives a calculated character storage address to the ROM 104 for font data storage. Then the CPU 105 reads font data output from the ROM 104 for font data storage and stores the font data in the RAM 103 for temporary storage of font data.

The CPU 105 repeats the above-mentioned processings to store all font data for one screen display on a liquid crystal screen in the RAM 103 for temporary storage of font data. Then, the CPU 105 transfers the data stored in the RAM 103 for temporary storage of font data to the liquid crystal driving device 102, and gives a display position and the like on the liquid crystal display 101. The liquid crystal driving device 102 to which these data are transferred carries out a processing of displaying the character of a character code transferred to the liquid crystal display 101. FIG. 20 shows a flowchart for the above-mentioned character display processing according to the prior art (S101 to S107).

Japanese Unexamined Patent Publication No. HEI 4(1992)-294418 discloses a font pattern transfer LSI provided with a character generator wherein a character code is converted to a physical address of the character generator using an address conversion table ROM.

As described above, a character corresponding to a specified character code has conventionally been displayed. However, the font data stored in the ROM 104 for font data storage cannot be directly given to the liquid crystal driving device 102 depending on the combination of the input bus width of the liquid crystal driving device 102 and the size of the font data. Therefore, it has been necessary to carry out a processing of first expanding the font data stored in the ROM 104 for font data storage into the RAM 103 for temporary storage and then giving the expanded data to the liquid crystal driving device 102. The CPU 105 has carried out almost all of a series of processings. The details of the processing will be described below.

FIG. 18 illustrates the storage of font data of a 12-dot size character in the ROM 104 for font data storage.

In the case where a character string to be displayed on the liquid crystal display 101 has two Chinese characters of 漢 and 字 the character codes thereof are given with JIS codes of "3441" and "3B7A", and with shift JIS codes of "8ABF" and "8E9A".

The CPU 105 calculates the character storage address of the ROM 104 for font data storage from the character code by referring to the character code-character storage address conversion table shown in FIG. 23 or FIG. 24.

First, the first character of 漢 of the character string will be mentioned. FIG. 25 illustrates a relationship between a display RAM for the Chinese character of 漢 provided in the liquid crystal driving device 102 and a screen display actually displayed on the liquid crystal display 101.

As shown in FIG. 25, the relationship between the screen display of the liquid crystal display 101 and the contents of the display RAM provided in the liquid crystal driving device 102 assumes one-to-one correspondence. Thus, the data written into the display RAM is exactly displayed on the screen of the liquid crystal display 101.

If input data have a width of 8 bits, one address of the display RAM provided in the liquid crystal driving device 102 has an 8-bit structure. For example, a write unit in an X direction is 8 bits and data having 8 bits is given to the display RAM to write actual data. Accordingly, if the data input width of the liquid crystal driving device 102 has 8 bits, the CPU 105 should input character data to the liquid crystal driving device 102 twice in the X direction and twelve times in the Y direction of the liquid crystal screen. As a result of the above character data input, the character of 漢 is displayed on the liquid crystal screen as shown in FIG. 22.

FIG. 19 illustrates an example of the storage of font data on the second Chinese character of 字 having a 12-dot size. In the case where the second character of 字 is to be displayed on the right side of the first character of 漢 a space of five dots (a region "a" in FIG. 26) is formed between the two characters as shown in FIG. 26.

More specifically, although the character data itself has a 12-dot size, an escapement width is restricted by the bit width or the like of the data input to the liquid crystal driving device 102.

Conventionally, the character data has been once stored in the RAM 103 for temporary storage of font data to determine the escapement width irrespective of the data input width of the liquid crystal driving device 102, and then the CPU 105 has carried out a processing of adjusting a bit position or the like in the RAM 103 for temporary storage as described above.

Moreover, the font data has been transferred to the liquid crystal driving device 102 not in a character unit but as pixel data (that is, data for each dot). In order to display a character on the liquid crystal display 101, the CPU 105 needs to calculate a font data storage address from a given character code, give the calculated address to the ROM 104 for font data storage and transfer character data corresponding to the address to the RAM 103 for temporary storage for each character. After all data for one screen is transferred to the RAM 103 for temporary storage, the CPU 105 transfers the data from the RAM 103 for temporary storage to the liquid crystal driving device 102.

However, an excessive load has been imposed on the CPU 105 to execute all of a series of display processings. Further, there has been a problem in that a delay is caused on the execution of other processings than the display processing during the execution of the display processing on the liquid crystal screen. Moreover, since the above-mentioned series of display processings are executed in software, they are very complicated.

Further, an additional processing for easy viewing is executed such as displaying a plurality of characters having 10 different font sizes on the same screen. In this case, a more complicated processing should be executed. The number of times that the CPU 105 gives access to the ROM 104 for font data storage, the RAM 103 for temporary storage and the like is increased more greatly than in the case where fonts having the same size are processed. Consequently, a load on the CPU 105 is very large.

On the other hand, character data having a 12-dot size is stored in the ROM 104 for font data storage in the form as shown in FIGS. 18 and 19 as described above. However, a dead region is usually present.

As shown in FIG. 16, a 16-bit width is usually utilized as a bus width for the data output of the ROM 104 for font storage in order to have versatility. However, a region "a" shown in FIG. 18 is a dead storage region and an 8-bit bus width also causes such a dead storage region. In general, as long as a bus width is a multiple of eight, a dead storage region is generated.

Moreover, as shown in FIG. 18, a region "b" consisting of lower four dots acts as a dead storage region so that a head address where each character is to be stored can be easily calculated from a character code. The reason is that character data has conventionally been output from the ROM 104 for font data storage based on a processing flow shown in FIG. 21.

Hereinafter, description will be given to the details of a conventional address calculation and processing of outputting character data as shown in FIG. 21.

A character storage address obtained from the character code-character storage address conversion table shown in FIG. 23 will be hereinafter referred to as a "character address-1". The character address-1 corresponds to addresses of A4 to A17 shown in FIG. 18.

An address common to all characters will be referred to as a "scan address". The scan address corresponds to addresses of A0 to A3 shown in FIG. 21.

The "character address-1" is generated in the following manner (Steps S111 and S112). In the case where a JIS code is used as a character code, the JIS code of the Chinese character of 漢 is "3441" in a hexadecimal number which has first and second bytes of "34" and "41" expressed in the hexadecimal number, respectively.

In this case, the first byte of the JIS code is present between "30" and "41" expressed in the hexadecimal number. Therefore, a conversion table of (1)-(b) shown in FIG. 23 is used. The first byte of "34" is "0110100" expressed in a 7-bit binary number, which means b16=b15=b13=1 and b17=b14=b12=b11=0.

According to the conversion table of (1)-(b) shown in FIG. 23, b17=A15, b14=A14, b13=A13, b12=A12 and b11=A11 are obtained. According to the conversion table, consequently, A15=0, A14=0, A13=1, A12=0 and A11=0 are obtained.

Similarly, the second byte of "41" is "1000001" expressed in a 7-bit binary number, which means b27=b21=1 and b26=b25=b24=b23=b22=0. On the other hand, according to the conversion table of (1)-(b), b27=A10, b26=A9, b25=A8, b24=A7, b23=A6, b22=A5 and b21=A4 are obtained. Therefore, A10=1, A9=0, A8=0, A7=0, A6=0, A5=0 and A4=1 are obtained.

Moreover, the conversion table of (1)-(b) shows A17=A16=0. Therefore, the character address-1 is represented by A17 to A4=(0, 0, 0, 0, 1, 0, 0, 1, 0, 0, 0, 0, 0, 1) in a binary number, and by 241 in a hexadecimal number (Steps S113 and S114). When the character address-1 is given to the ROM 104 for font data storage and the scan address is sequentially incremented, the character data are sequentially output from the output terminals D0 to D15) of the ROM 104 for font data storage (Steps S115, S116 and S117).

In the case of the character data of z,1 in FIG. 18, an address represented by the combination of a character address-1 indicated as A17 to A4 and a scan address (A0 to A3) is expressed as "2410", "2411", "2412",. . . , "241F" in a hexadecimal number. When the address starting with "2410" is sequentially input to the ROM 104 for font data storage, the bit data of the character data is output to the output terminals D0 to D15 in response to the input address.

More specifically, when the address of "2410" is input, "0000" is output as data (D0 to D15) for the first row in FIG. 18 because of (A3, A2, A1, A0)=(0, 0, 0, 0). When the address of "2411" is input, "4220" is output as data (D0 to D15) for the second row because of (A3, A2, A1, A0)=(0, 0, 0, 1). When the address of "2412" is input, data (D0 to D15) "27F0" for the third row is output because of (A3, A2, A1, A0)=(0, 0, 1, 0). In the following, the bit data of the character data of 漢 is sequentially output in the same manner.

Thus, the character having a 12-dot size shown in FIG. 18 requires the volume of data per one character smaller than a character having a 16-dot size. However, an address space is represented by 16 bits determined by the character address-1 and the scan address. Therefore, the same data volume required by the character font having a 16-dot size should be stored as the volume of data stored in the ROM 104 for font data storage.

For example, a data volume of 12×12=144 bits is required per one character for the character font having a 12-dot size, while a data volume of 16×16=256 bits is required per one character for the character font having a 16-dot size.

Accordingly, also in the case where the data of the character having a 12-dot size is to be stored in the ROM 104 for font data storage, a storage region which is as large as the storage region for the data of the character having a 16-dot size is required. Therefore, the chip size of the ROM 104 for font data storage is increased.

Further, in addition to a connection between the CPU 105 and the liquid crystal driver 102, a connection of the CPU 105 and the liquid crystal driving device 102 with the ROM 104 for font data storage and the RAM 103 for temporary storage of font data is required as shown in FIG. 15. However, the number of the input and output terminals is great and a large number of addresses and data wirings are required for these connections. Therefore, it is necessary to increase an area where these chips are to be mounted.- That is, it is difficult to reduce the size of the whole device in the structure shown in FIG. 15.

SUMMARY OF THE INVENTION

The present invention provides a semiconductor device for display control comprising an input section for receiving a display information including a character code, a display position information and a character size information, a first address generating section for generating a first address group corresponding to the received character code by applying a predetermined conversion rule to the received character code and character size information, a font data storing section for prestoring font data corresponding to the character data in a region specified by the first address group and outputting the font data stored in the region specified by the first address group when the first address group is given, a second address generating section for generating a second address group by utilizing the received display position information, the second address group representing a region where the font data output from the font data storing section is to be expanded, a font data expanding section for expanding and temporarily storing the font data output from the font data storing section in the region represented by the second address group generated by the second address generating section, and an output section for outputting the font data stored in the font data expanding section to an external display driving unit.

Consequently, the load on a CPU for a screen display processing can be decreased, the size of a circuit structure necessary for display can be reduced and a display processing program can be simplified.

BRIEF DESCRIPTION OF THE DRAWINGS

FIG. 6 is a character code storage address conversion table according to the present invention;

FIG. 7 is a character code storage address conversion table according to the present invention;

FIG. 9 is a diagram for explaining the input and output terminals of the semiconductor device according to the present invention;

FIG. 10 is a diagram illustrating an example of command data input to the semiconductor device according to the present invention;

FIG. 23 is a diagram illustrating a character code-character code storage address conversion table according to the prior art;

FIG. 24 is a diagram illustrating the character code-character code storage address conversion table according to the prior art;

DESCRIPTION OF THE PREFERRED EMBODIMENTS

Figure 1:
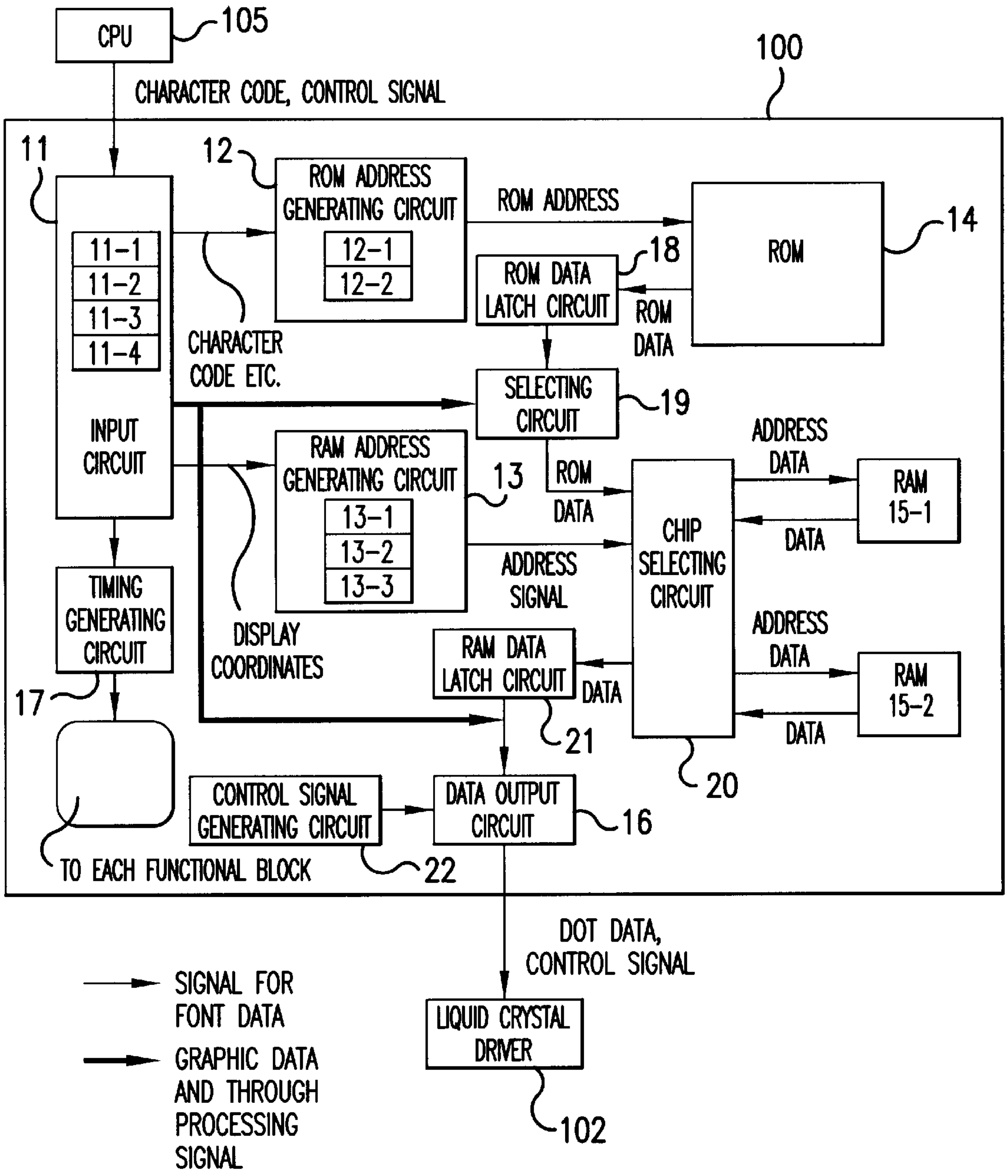
FIG. 1 is a block diagram showing the function of a semiconductor device for display control according to the present invention.

The present invention provides a semiconductor device capable of decreasing a load on a CPU during a screen display processing, increasing a display speed, reducing the size of a display system structure and simplifying a program for the display processing.

In the present invention, the display information received by the input section is command information having an identifier for identifying a character code, display position information and character size information.

The first address group generated by the first address generating section comprises a head address of font data stored in the font data storing section and a number of addresses succeeding the head address. The number of the succeeding addresses corresponds to the character size information. The head address is calculated as a product of a conversion code value obtained by converting the character code in accordance with the predetermined conversion rule and the character size information.

The first address generating section may include a first serial counter for sequentially incrementing from a head address to an address which is the number corresponding to the character size information plus the head address, thereby to generate the address.

In the present invention, plural pieces of display information received by the input section are constituted by a start command indicative of the head of the plural pieces of display information, a character command containing a plurality of character codes, the display position information of each character code and the character size information of each character code, and an end command indicative of the end of the display information.

The second address group generated by the second address generating section comprises a head address obtained from the received display position information, and a number of addresses succeeding the head address. The number of the succeeding addresses corresponds to the number of character codes contained in the character command which is received by the input section. The second address generating section may include a second serial counter for sequentially incrementing from the head address to an address which is the number corresponding to the number of character codes plus the head address, thereby to generate the address.

The font data expanding section may be constituted by a plurality of RAMs. Further, the second address generating section may include a RAM address converting section for sequentially distributing the address generated by increment by means of the second serial counter to each of the RAMs and outputting the address to each of the RAMs in a predetermined timing when font data is to be written into or read from the font data expanding section.

According to the present invention, the font data expanding section may be constituted by a plurality of RAMs and the font data output from the font data storing section may be separated on a time sharing basis to be written into and read from the RAMs.

Furthermore, the present invention provides a display control device comprising a CPU, the semiconductor device for display control and a liquid crystal driving device, wherein the CPU gives the display information to the semiconductor device for display control and the output section of the semiconductor device for display control gives the font data to the liquid crystal driving device.

The semiconductor device for display control according to the present invention is implemented by one chip having functional blocks such as the aforementioned first address generating section and the like provided therein. Moreover, the internal processings of the functional blocks are mainly implemented by a hardware logic without using the CPU.

The input section has a control logic for controlling the input and output of a predetermined signal mainly between the input section and the CPU. The CPU and the semiconductor device are connected through a so-called bus wiring comprising several signal lines.

Examples of a signal contained in the bus wiring between the CPU and the semiconductor device include a so-called data line (D0 to D7), an FMA signal, an FMRT signal, an FMCS signal, an FMBUSY signal, an RESB signal, a CSB signal, an RS signal, a WRB signal, an RDB signal and the like. The details of these signals will be described later.

It is preferable that the font data storing section should be constituted by a ROM which is a nonvolatile memory to store predefined font data. The font data expanding section includes a region for specifying the display position of font data corresponding to the received display information and expanding the font data therein. Therefore, it is preferable to use a RAM capable of writing and reading.

Hereinafter, the present invention will be described in detail with reference to the example shown in the drawings. However, the present invention is not limited thereto.

Figure 2:
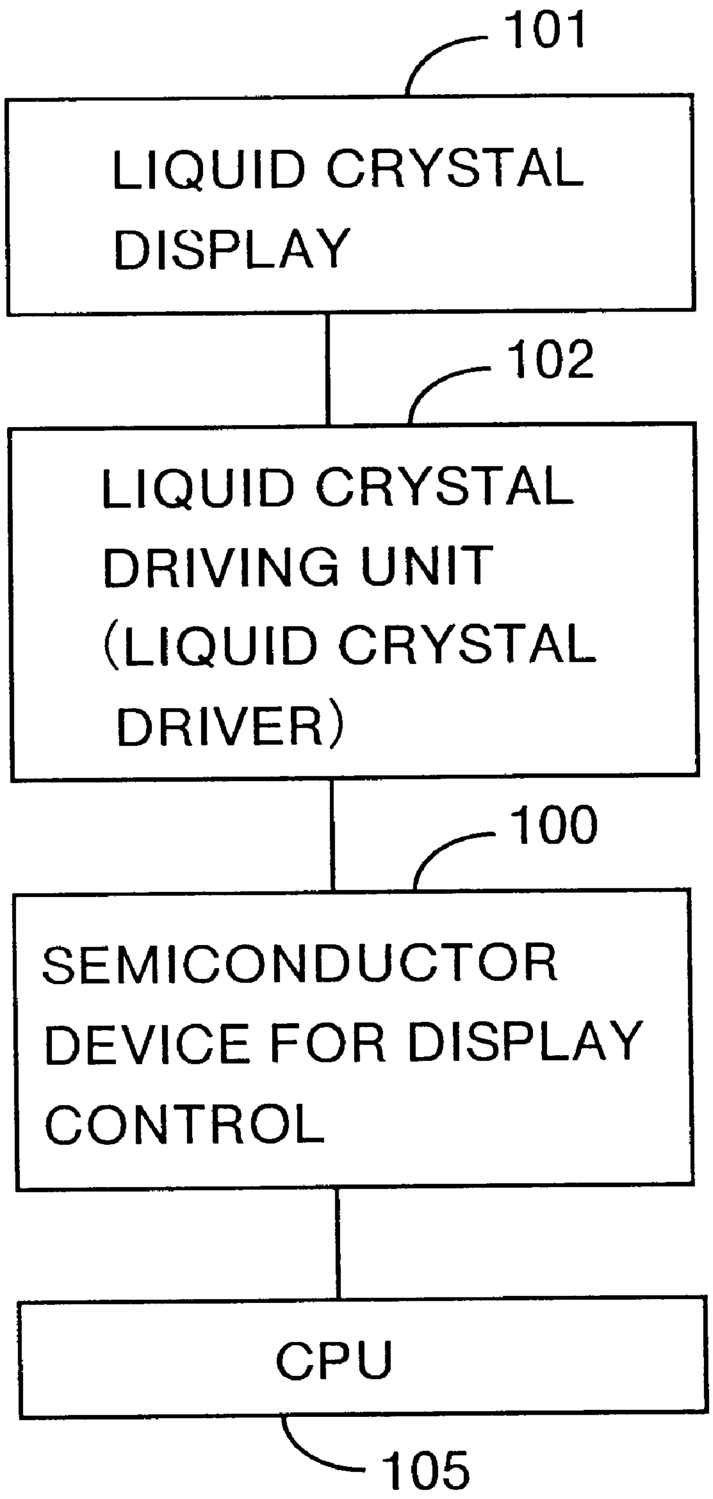
FIG. 2 is a block diagram showing the structure of a display device according to the present invention.

FIG. 1 is a block diagram showing the function of a semiconductor device for display control according to the present invention. FIG. 2 is a block diagram showing the structure of a device for performing display on a liquid crystal display according to the present invention.

Figure 15:
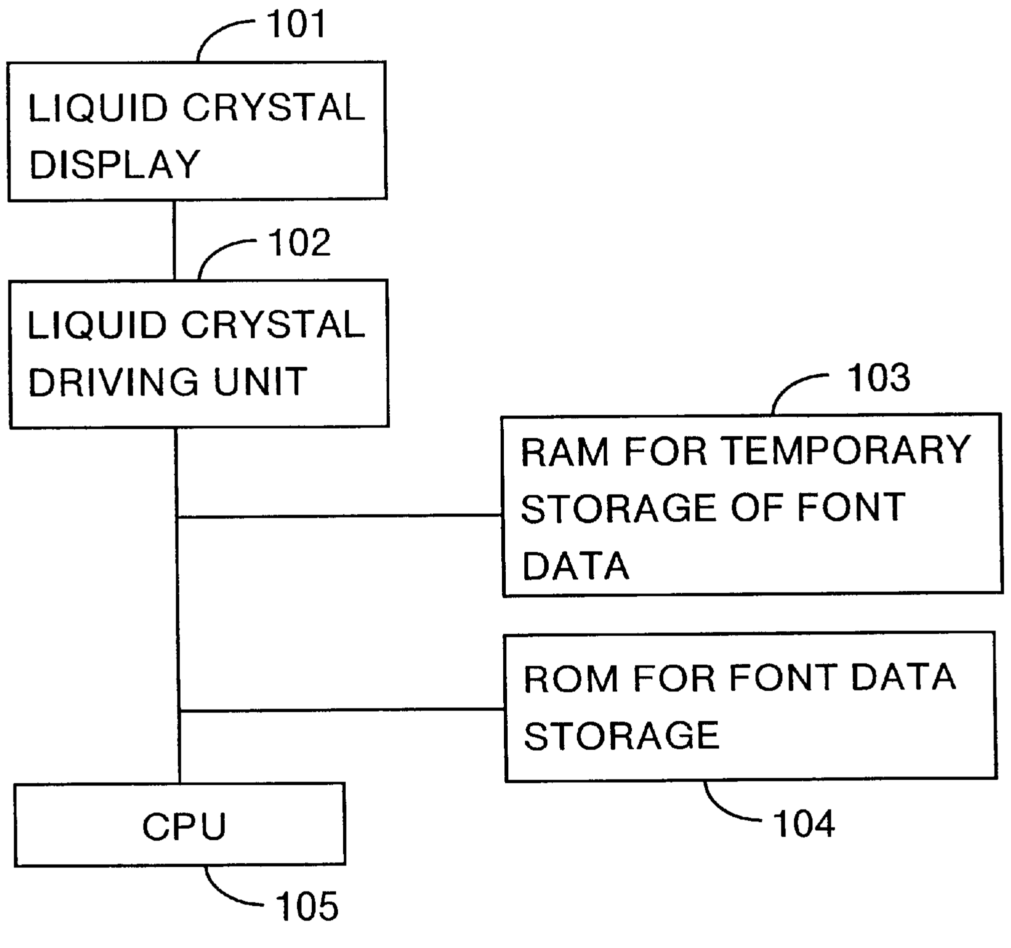
FIG.15 PRIOR ART
FIG. 15 is a block diagram showing the structure of a display device according to the prior art.
Figure 16:
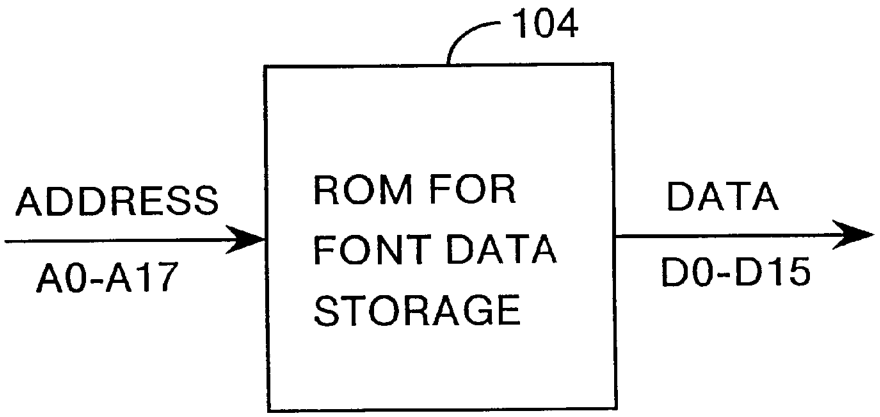
FIG. 16 PRIOR ART
FIG. 16 is a diagram illustrating the input and output terminals of a ROM for font data storage according to the prior art.
Figure 17:
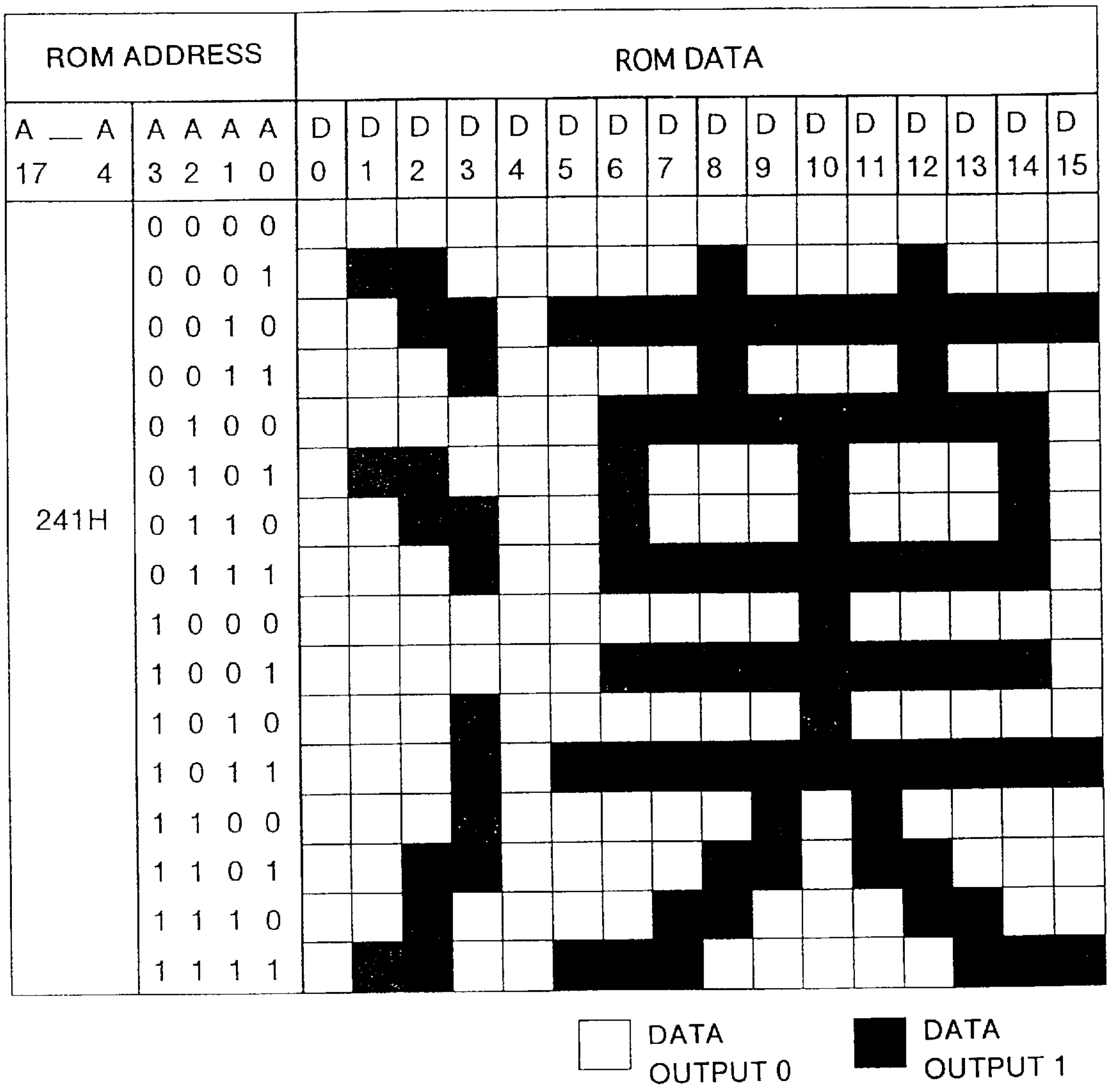
FIG.17 PRIOR ART
FIG. 17 is a diagram illustrating an example of the storage of character font data having a 16-dot size according to the prior art.

In FIG. 2, a CPU 105, a liquid crystal display 101 and a liquid crystal driving device 102 (hereinafter referred to as a liquid crystal driver) are the same as those shown in FIG. 15. The feature of the present invention is that a semiconductor device 100 is connected between the CPU 105 and the liquid crystal driver 102.

In FIG. 1, the semiconductor device 100 according to the present invention is constituted by a ROM 14 for font data storage, RAMs (15-1, 15-2) for font data expansion and several control circuits for performing addressing for the ROM and the RAM and for reading and writing data from and into the ROM and the RAM.

An input circuit 11 is equivalent to the input section and serves to receive a control signal such as a command, a character code or the like which is sent from the CPU 105, thereby identifying the contents of the command and the character code. The input circuit 11 is constituted by a timing adjusting circuit 11-1, a command identifying circuit 11-2, a liquid crystal driver control identifying circuit 11-3, and a data output circuit 11-4 for a liquid crystal driver.

The command identifying circuit 11-2 identifies a character code, outputs the character code to a ROM address generating circuit 12, and outputs liquid crystal display coordinate data to a RAM address generating circuit 13. The liquid crystal driver control identifying circuit 11-3 serves to send a direct control signal to the liquid crystal driver 102 through a data output circuit 16. The timing adjusting circuit 11-1 serves to give a timing generating instruction to a timing generating circuit 17.

The ROM address generating circuit 12 is equivalent to the first address generating section and includes a Chinese character code address converting circuit 12-1 for generating a head address of the ROM 14 for font data storage from a character code given from the input circuit 11 in accordance with a predetermined conversion rule (see FIGS. 6 and 7). Moreover, the ROM address generating circuit 12 includes a serial counter 12-2 for sequentially counting up (incrementing) the address to the number of the pieces of the given character size information after generating the head address and for sequentially outputting ROM addresses for all the given character codes. The serial counter 12-2 is equivalent to the first serial counter.

The ROM 14 for font data storage is a ROM in which font data having a predetermined size for each character is stored. In this case, an output bit number is 12 and data having 12-dot and 8-dot sizes is stored in the ROM 14 for font data storage. Moreover, the font data for each character is efficiently stored in the ROM 14 for font data storage corresponding to an address generated by the ROM address generating circuit 12.

A ROM data latch circuit 18 latches ROM data of 12 bits which is output from the ROM 14 for font data storage and outputs the data by one bit to a chip selecting circuit 20. ROM data on a next address is read from the ROM 14 for font data storage while the ROM data is latched.

A user-defined character data-ROM data selecting circuit 19 serves to select user-defined character data given from the CPU 105 or the ROM data given from the ROM data latch circuit 18, and serves to output the user-defined character data to the chip selecting circuit 20 when user-defined characters which are not defined by character codes, that is, characters which are not stored in the ROM 14 for font data storage and the like are directly input from the CPU 105.

A RAM address generating circuit 13 is equivalent to the second address generating section, and generates a reading address or a writing address for reading data from display coordinates given from the input circuit 11 or writing the data into the RAMs 15-1 and 15-2 for font data expansion and then gives the reading address or the writing address to the chip selecting circuit 20.

Moreover, the RAM address generating circuit 13 counts up (increments) an address automatically and sequentially in order to read and write a whole character from and into the RAMs 15-1 and 15-2 for font data expansion. A RAM address output serial counter 13-3 counts up the address. The counter 13-3 is equivalent to the second serial counter.

A write XY coordinate address converting circuit 13-1 and a read XY coordinate address converting circuit 13-2 serve to distribute an address generated from the given display coordinates to each of the RAMs 15-1 and 15-2 for font data expansion if a plurality of RAMs 15-1 and 15-2 for font data expansion are provided.

The chip selecting circuit 20 having a RAM address latch circuit provided therein selects either of two RAMs 15-1 and 15-2 for font data expansion to output the address given from the RAM address generating circuit 13 to the selected RAMs 15-1 or 15-2 while providing a timing with the ROM data. At this time, it is necessary to distribute the address given from the RAM address generating circuit 13 to either of the two RAMs 15-1 and 15-2, therefore, this address is latched once. While the address is latched, the RAM address generating circuit 13 generates a next address.

A RAM data latch circuit 21 serves to latch the data read from the RAMs 15-1 and 15-2 through the chip selecting circuit 20.

In the case where the data read from the RAMs 15-1 and 15-2 is 4-bit data, it is reassembled as 8-bit data after the latching and then output to the data output circuit 16. Moreover, 4-bit data corresponding to the next address is read from the RAMs 15-1 and 15-2 while the data is latched.

A control signal generating circuit 22 for a liquid crystal driver serves to provide a write timing signal for informing the liquid crystal driver 102 of a write timing at the output of various data and a control signal to the liquid crystal driver 102.

The data output circuit 16 serves to output the data read from the RAMs 15-1 and 15-2 to the liquid crystal driver 102. The control signal for the liquid crystal driver 102 which is given from the CPU 105 and the write timing signal generated by the control signal generating circuit 22 for a liquid crystal driver are also output to the liquid crystal driver 102.

The RAMs 15-1 and 15-2 for font data expansion serve to temporarily store character data for one block to be displayed in an address specified by the RAM address generating circuit 13 in order to display character data stored in the ROM 14 for font data storage.

The character data for one block means character data of one character or a plurality of characters. One dot on the screen of the liquid crystal display 101 corresponds to one bit of the data stored in the RAMs 15-1 and 15-2 for font data expansion. The timing generating circuit 17 serves to give a timing signal to the functional blocks 12, 13, 14, 15-1, 15-2 and the like based on the given timing generating instruction.

The CPU 105 only gives command data including data on a character code, a character size and a display position to the semiconductor device 100 having the above-mentioned structure. All the special processings for the display are executed in the semiconductor device 100 and font data corresponding to the character code is generated and given to the liquid crystal driver 102.

The specific structure and operation of the functional blocks of the semiconductor device 100 according to the present invention will be described below. It is assumed that the screen size of the liquid crystal display 101 is 128 dots (X direction)×64 dots (Y direction), font data to be utilized have 12 dots and 8 dots and the font data having 12-dot and 8-dot sizes of each character are stored in the ROM 14 for font data storage.

FIG. 9 is a diagram illustrating the input-output terminals of the semiconductor device according to the present invention. Five terminals (D0 to D7, FMA, FMRT, FMCS and FMBUSY) shown in (1) to (5) are peculiar to the semiconductor device of the present invention, and the terminals RESB, CSB, RS, WRB and RDB are necessary for driving the liquid crystal driver 102. Terminals of (1) to (10) in FIG. 9 are mainly connected to the CPU 105, some of which are also connected to the liquid crystal driver 102. VCC and GND represent a power terminal and a ground terminal, respectively, as in an ordinary LSI.

The terminals D0 to D7 shown in (1) of FIG. 9 serve to output data to the liquid crystal driver 102 and to input and output a character code and command data which are given from the CPU 105.

The terminal FMA shown in (2) carries out switching between data transfer from the CPU 105 to the semiconductor device 100 and direct data transfer from the CPU 105 to the liquid crystal driver 102. For example, if the FMA terminal is set to the L level "0" and a necessary signal is given to the terminals shown in (6) to (10), the liquid crystal driver 102 can directly be driven by the CPU 105.

The terminal FMRT in (3) is a latch timing signal terminal for inputting data and commands from the CPU 105 to the semiconductor device 100.

The terminal FMCS in (4) is an input terminal from the CPU 105 and serves to carry out switching between the operating state of the semiconductor device 100 and the standby state thereof. The terminal FMBUSY in (5) is an output terminal for notifying an external device such as a CPU whether the semiconductor device 100 is ready for the input of a signal or not.

FIG. 10 illustrates an example of command data (which will be hereinafter referred to as an input command) to be input to the semiconductor device 100 according to the present invention.

There are seven kinds of input commands. The contents of the input commands include data on a character code to be displayed on the liquid crystal display 101, a display position (an address) thereof, a character size and the like.

In FIG. 10, one input command comprises eight bits in principle. In the 8-bit input-output terminals D0 to D7, upper 4 bits of D4 to D7 are identifiers of each input command, that is, serve to specify a command number. Lower 4 bits of D0 to D3 represent the data contents of the input command. In some cases, the data contents further continue immediately after the 8-bit input command. For example, a command number of "0" represents D7=D6=D5=D4=0, and indicates lower 4 bits of an address in an X direction of the display position on the screen of the liquid crystal display 101 from D3 to D0.

If the X-axis direction of the liquid crystal display screen is 128 dots, 7 bit data (0 to 7 FH) is required in all to specify the address in the X direction for one dot. An input command having a command number of "1" serves to specify an address in the X direction of the remaining upper 4 bits.

Similarly, an input command having a command number of "2" serves to specify lower 4 bits of an address in a Y direction and an input command having a command number of "3" serves to specify higher 4 bits of the address in the Y direction.

Moreover, an input command having a command number of "4" serves to specify a Chinese character code to be displayed and serves to specify a font size, black-and-white inversion setting and escapement (increment) setting in the X direction for a first byte of data having a 3-byte length and to specify a Chinese character code (K0 to K15) based on second and third byte data.

An input command having a command number of "5" serves to specify escapement (increment) setting in the Y direction and an input command having a command number of "6" serves to specify the start and end of a command input. The above-mentioned seven input commands are not limitative but various command input systems can be defined based on a design specification.

In FIG. 10, the kinds of the input commands are distinguished by every four bits (D4 to D7). Therefore, a maximum of 16 kinds can be defined but they are not limited thereto, and the distinction can be carried out in other ways. If more input commands are to be defined, they may be distinguished by using a bit number of 5 or more.

For displaying a certain character, the CPU 105 gives the semiconductor device 100 information necessary for the display such as a display position (an address) on the liquid crystal display screen, a character code, a font size, an escapement size and the like by using the input commands. The input command is continuously input to the semiconductor device 100 synchronously with an FMRT signal sent from the CPU 105 to the semiconductor device 100 irrespective of the operating timing of the liquid crystal driver 102.

Figure 3:
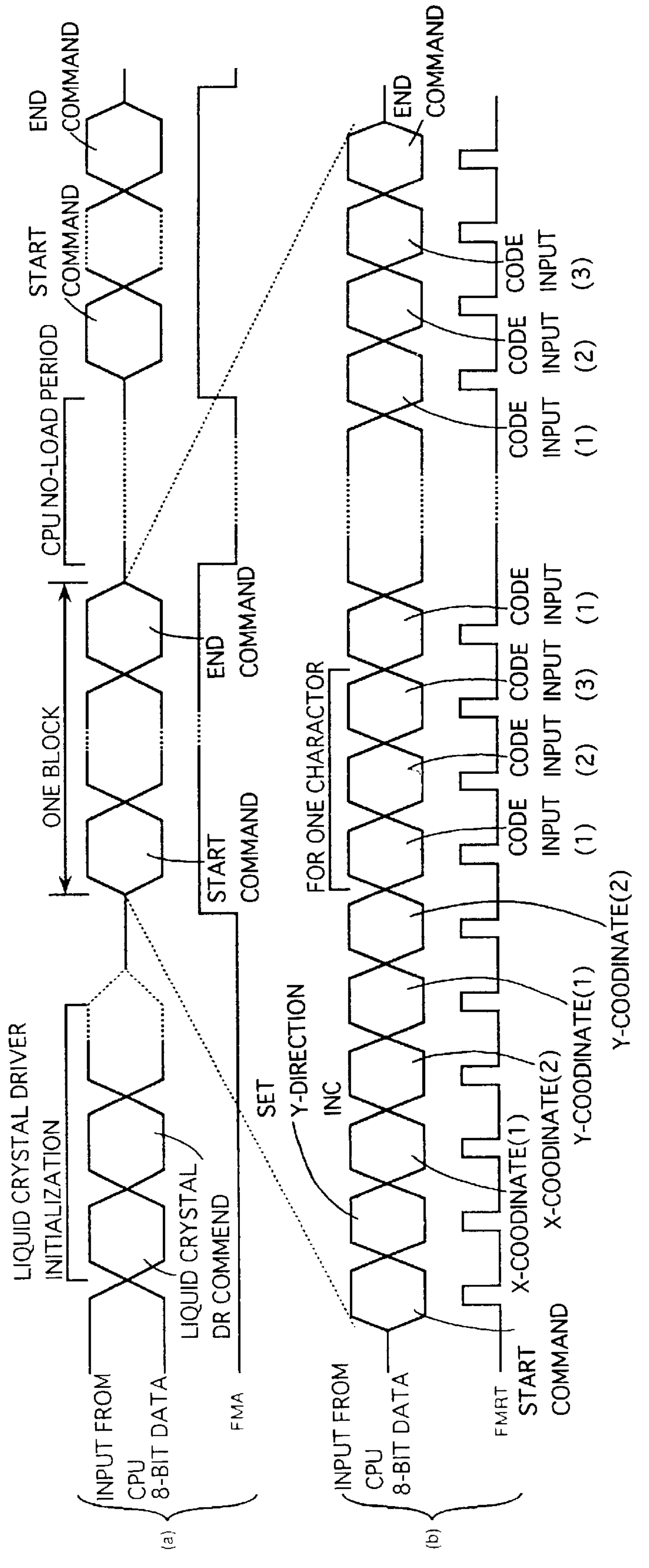
FIG. 3 is a timing chart for the input signal of the semiconductor device according to the present invention.

FIG. 3 is a timing chart for FMRT and FMA signals and an input command which are input to the semiconductor device 100 according to the present invention.

FIG. 3(*a*) shows an example in which the FMA signal is set to the H level before the input of an input command for one block which comprises a plurality of character data and the FMA signal is set to the L level after the input of the input command is completed.

The input command for one block begins with a START command (a command number of "6" in FIG. 10), followed by a character command specifying a plurality of character codes and the like, and ends with an END command (the command number of "6" in FIG. 10).

For a period after the input of the input command for one block is terminated, the CPU 105 itself does not need to execute a processing related to the display. More specifically, this period is a so-called CPU no-load period related to the display. During the CPU no-load period, accordingly, the CPU 105 can execute other processings than the display, and the load on the CPU 105 concerning the display processing can be reduced.

Further, FIG. 3(*a*) shows a timing in which the liquid crystal driver 102 is initialized before the input command for one block is input. In FIG. 3(*a*), the CPU 105 directly initializes the liquid crystal driver 102 through the semiconductor device 100 by setting the FMA signal to "L". More specifically, a command for the liquid crystal driver 102 given to the liquid crystal driver 102 in this timing is not analyzed at all by means of the semiconductor device 100.

FIG. 3(*b*) shows a timing relationship between the input command for one block and the FMRT signal and indicates that each input command is fetched into the semiconductor device 100 while the FMRT signal has the H level.

When the input command is thus fetched, a specification of Y-direction escapement, upper and lower bits of an X-direction address, upper and lower bits of a Y-direction address, a plurality of character codes and the like are input to the semiconductor device 100 and are first buffered into the input circuit 11 as shown in FIG. 3(*b*).

Figure 4:
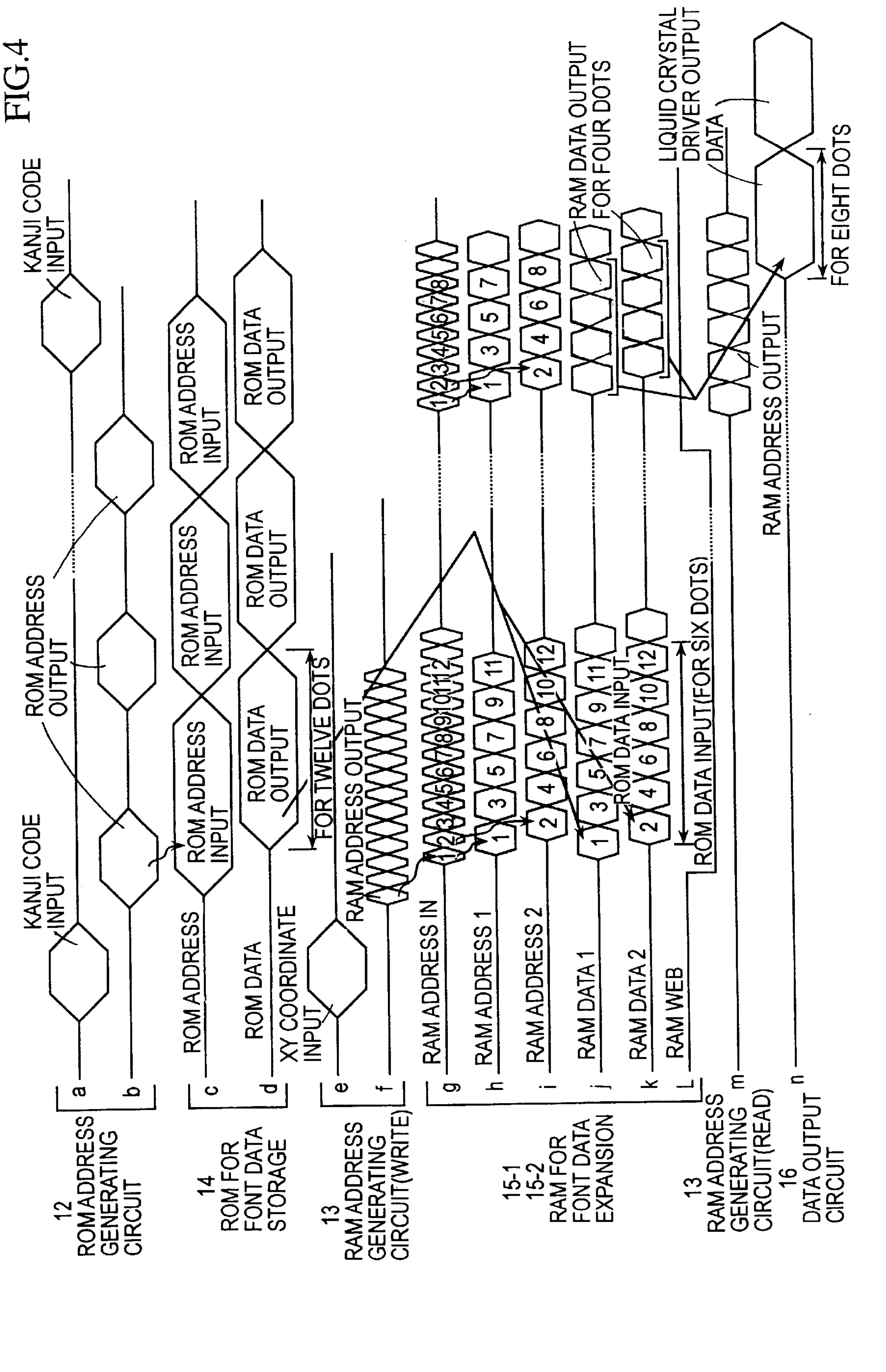
FIG. 4 is a timing chart for the detailed internal operation of the semiconductor device according to the present invention.

FIG. 4 is a timing chart for the detailed internal operation of the semiconductor device according to the present invention.

Each data fetched into the input circuit 11 in the timing shown in FIG. 3(*b*) is sent to the ROM address generating circuit 12 and the RAM address generating circuit 13 in a predetermined timing. For example, data on a character code (a Chinese character code or the like) is transferred to the ROM address generating circuit 12 in a timing shown in "a" of FIG. 4, and the X-direction address and the Y-direction address are transferred to the RAM address generating circuit 13 in a timing shown in "e" of FIG. 4.

The ROM address generating circuit 12 generates a font data storage address (a ROM address) from the transferred data on the character code, and then outputs the ROM address to the ROM 14 for font data storage in a timing shown in "b" of FIG. 4.

Next, the ROM 14 for font data storage which received the ROM address reads font data corresponding to the ROM address, and outputs the font data as ROM data to the RAMs 15-1 and 15-2 for font data expansion ("c" and "d" of FIG. 4). For example, in the case where font data having a 12-dot size is to be output, font data (ROM data) for 12 dots is output by a one-time data output operation.

On the other hand, the data on the X-direction and Y-direction addresses which is transferred to the RAM address generating circuit 13 in the "e" of FIG. 4 is converted into RAM addresses for font data expansion by the RAM address generating circuit 13, and is output as the RAM addresses to the chip selecting circuit 20 in a timing of "f" of FIG. 4.

The RAM address is fetched by the chip selecting circuit 20 in a timing of "g" of FIG. 4, and then separated into RAM addresses for the RAMs 15-1 and 15-2 for font data expansion (into "h" and "i" from "g" of FIG. 4).

At this time, the RAM addresses having odd-numbered bits are sent to the RAM 15-1 for font data expansion as shown in the "h" of FIG. 4, and the RAM addresses having even-numbered bits are sent to the RAM 15-2 for font data expansion as shown in the "i" of FIG. 4.

Thus, the ROM data given to the RAMs 15-1 and 15-2 for font data expansion in the timing of "d" of FIG. 4 are written into the RAM addresses given to the RAMs 15-1 and 15-2 for font data expansion in the timings of "h" and "i" of FIG. 4, respectively.

At this time, ROM data for 12 dots is separated every six dots. The ROM data having odd-numbered dots is written into the RAM address of the RAM 15-1 for font data expansion which is shown in the "h" of FIG. 4 in a timing of "J" of FIG. 4, and ROM data having even-numbered dots is written into the RAM address of the RAM 15-2 for font data expansion shown in the "i" of FIG. 4 in a timing of "k" of FIG. 4.

Thus, the addresses to be written into the RAMs 15-1 and 15-2 are distributed and the read font data is divided into two portions to be written. Consequently, the speeds of writing and reading into and from the RAMs for font data (ROM data) expansion can get a margin.

Moreover, in FIG. 1, the outputs of the RAMs 15-1 and 15-2 for font data expansion have one bit. The reason is that a character can be displayed in any position of X-Y coordinates of the display screen.

"L" in FIG. 4 shows a write enable signal for the RAMs 15-1 and 15-2 for font data expansion, which indicates a writable state at the L level and a readable state at the H level.

As described above, when the font data on character codes for one block is written into the RAMs 15-1 and 15-2 for font data expansion and the END command shown in FIG. 3 is finally input to the RAM address generating circuit 13 through the input circuit 11, a RAM reading address is output in a timing of "m" of FIG. 4.

The RAM reading address is given to the RAMs 15-1 and 15-2 for font data expansion through the chip selecting circuit 20, and data corresponding to the RAM reading address is output from the RAMs 15-1 and 15-2 for font data expansion to the data output circuit 16 through the RAM data latch circuit 21 (see "n" of FIG. 4).

Then, the data output circuit 16 sequentially outputs, to the liquid crystal driver 102, a timing control signal and font data which are necessary for data writing. After the liquid crystal driver 102 fetches the font data, the same processing as in the prior art is executed.

Figure 5:
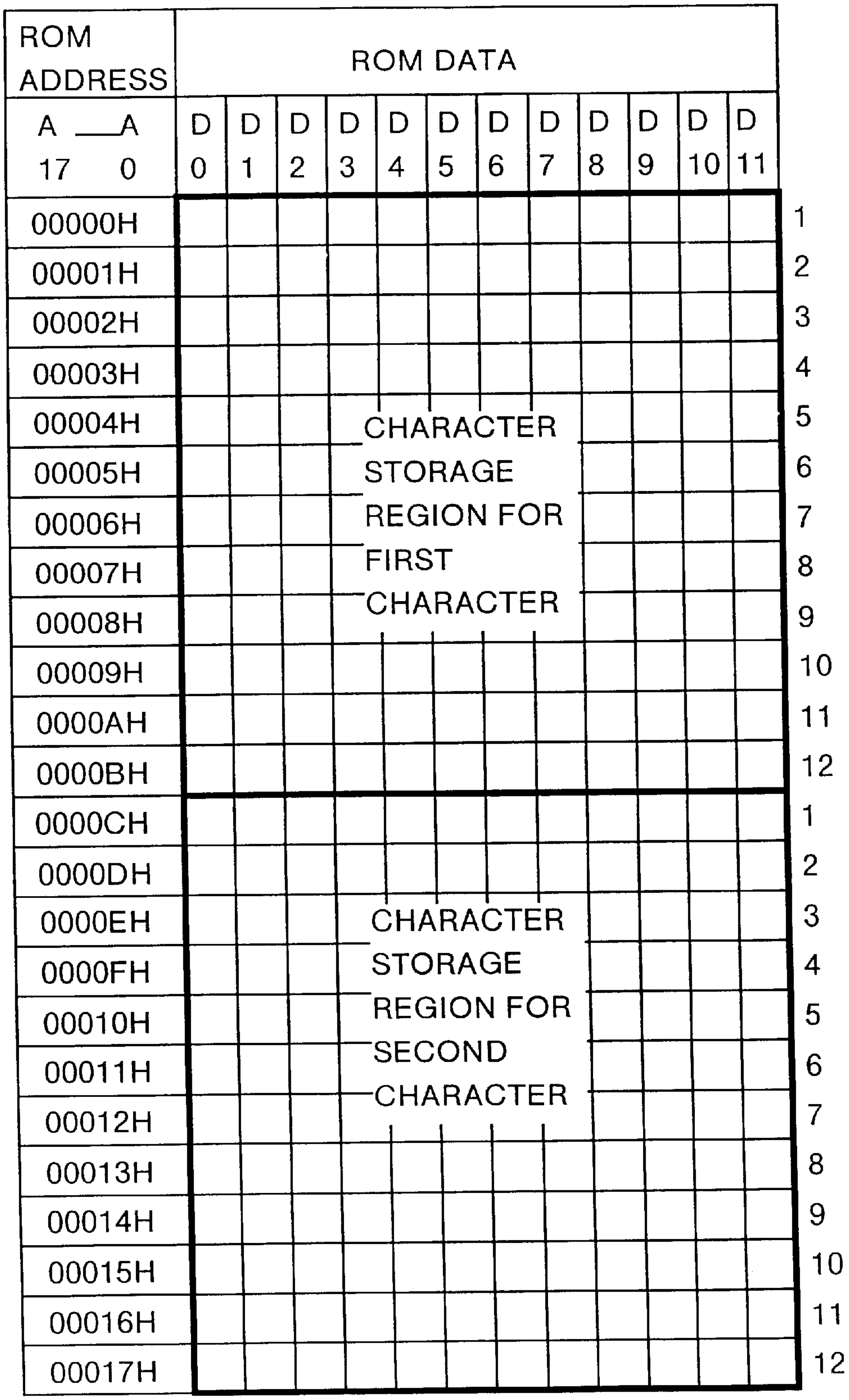
FIG. 5 is a schematic diagram showing the internal structure of a ROM for font data storage according to an embodiment of the present invention.

FIG. 5 is a schematic view illustrating the internal structure of the ROM 14 for font data storage according to an embodiment.

FIG. 5 shows the ROM 14 for font data storage in which a font having a 12-dot size is stored. Data having 12 bits correspond to one address, and one character is constituted by 12×12 dots. Accordingly, the above-mentioned conversion table shown in FIG. 23 cannot be used for such an internal structure.

In the present invention, the font data storage head address of the ROM 14 for font data storage is obtained from a given character code by using a character code storage address conversion table and a conversion expression as shown in FIG. 6 or FIG. 7. Further, the head address is incremented to a character size. Consequently, the storage addresses of the font data corresponding to the character codes can sequentially be generated.

Moreover, other character codes than JIS and shift JIS can also be stored in the same way as the conversion table and the conversion expression according to the present invention. Furthermore, various tables can be used for the conversion tables shown in FIGS. 6 and 7. As long as the conversion table and the conversion expression are used together, tables and expressions other than those shown in FIGS. 6 and 7 can also be used.

In the following, description will be given to an example in which a Chinese character code corresponding to the JIS code is stored according to the present invention.

Figure 14:
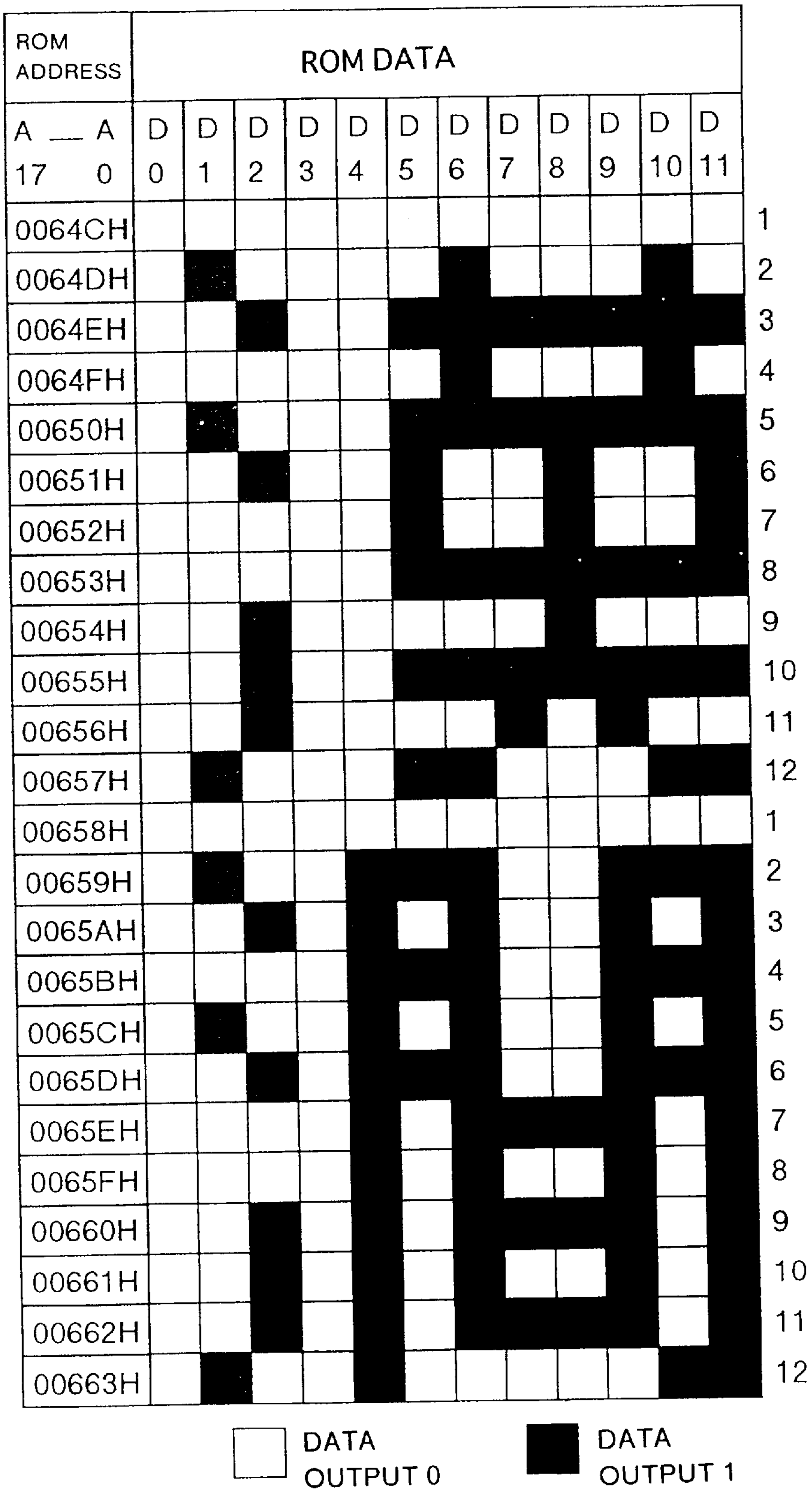
FIG. 14 is a diagram illustrating an example of the storage of a Chinese character code according to the present invention.

FIG. 14 illustrates an example in which the Chinese character code of a character of 漢 is stored according to the present invention. As described above, the JIS code of the character of z,1 is "3441" in a hexadecimal number.

At this time, according to (1)-(a)-② of the JIS code conversion table in FIG. 6, the JIS code of "3441" has b21=1, b22=0, b23=0, b24=0, b25=0, b26=0, b27=1, b11=0, b12=0, b13=1, b14=0, b15=1, b16=1 and b17=0.

Since b21=HB1, b22=HB2, b23=HB3, b24=HB4, b25=HB5, b26=HB6, b27=HB7, b11=HB8, b12=HB9, b13=HB10, b14=HB11 and b17=HB12 are obtained, a conversion code value is "241" in a hexadecimal number.

Then, according to an address conversion expression of (1)-(b) in FIG. 6, the head of a font data storage ROM address is 241×12=B4C. 12 is a decimal number and represents the dot size of font data to be stored. Font data on the JIS code "3441" is stored in a region within the ROM 14 for font data storage where the calculated address B4C acts as a head.

To the contrary, in the case where the stored font data is to be read, it is preferable that the conversion table of FIG. 6 should be applied to the given character code and character size, thereby calculating the head address of the character code in the ROM 14 for font data storage.

Figure 8:
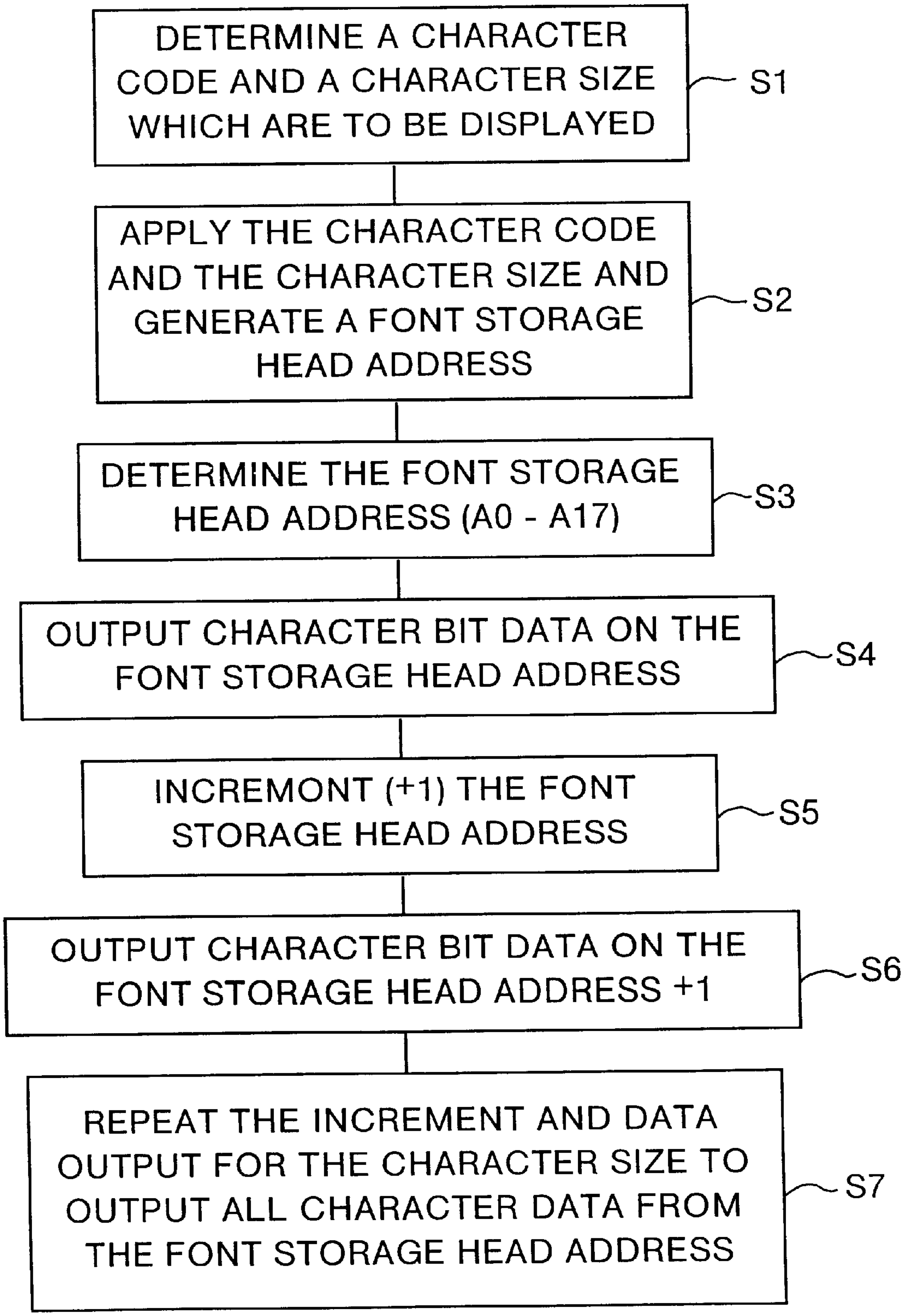
FIG. 8 is a flowchart for font data reading according to the present invention.

FIG. 8 is a flowchart for the font data reading according to the present invention. This processing is executed between the ROM address generating circuit 12 and the ROM 14 for font data storage.

First of all, a character code to be displayed and character size information thereof are given from the input circuit 11 (Step S1). Then, by applying a conversion rule shown in the conversion table of FIG. 6 or FIG. 7 to the character code and the character size, a font data storage head address is calculated to determine an address value (Steps S2 and S3).

Next, the head address value is output as a ROM address from the ROM address generating circuit 12 to the ROM 14 for font data storage (Step S4). Thereafter, the ROM address generating circuit 12 increments a font storage head address by the serial counter 12-2 (Step S5). The incremented address value is output as a ROM address to the ROM 14 for font data storage (Step SG). The increment and the output of an address value are repeated by the number corresponding to the number of the character size informations given at the Step S1 (Step S7).

Figure 18:
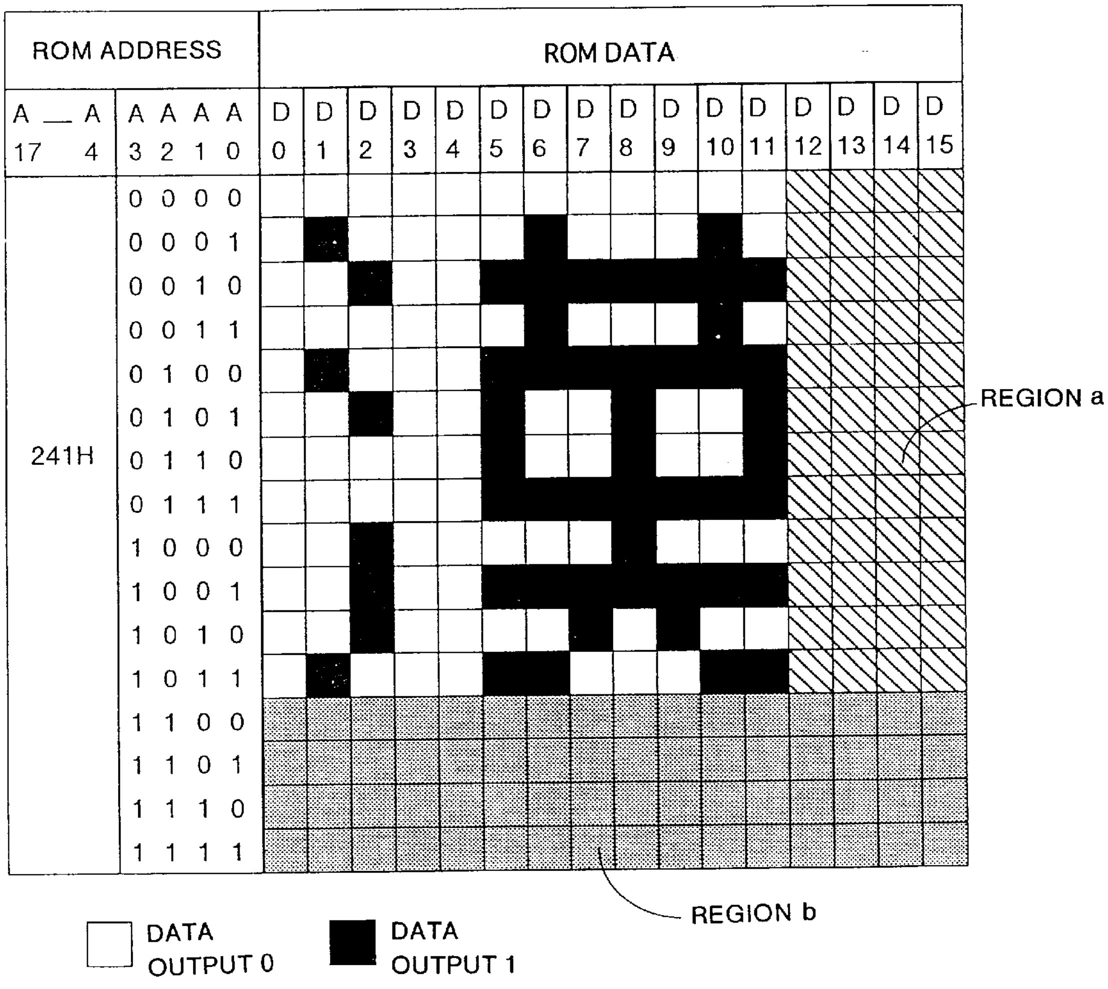
FIG.18 PRIOR ART
FIG. 18 is a diagram illustrating an example of the storage of character font data having a 12-dot size according to the prior art.
Figure 19:
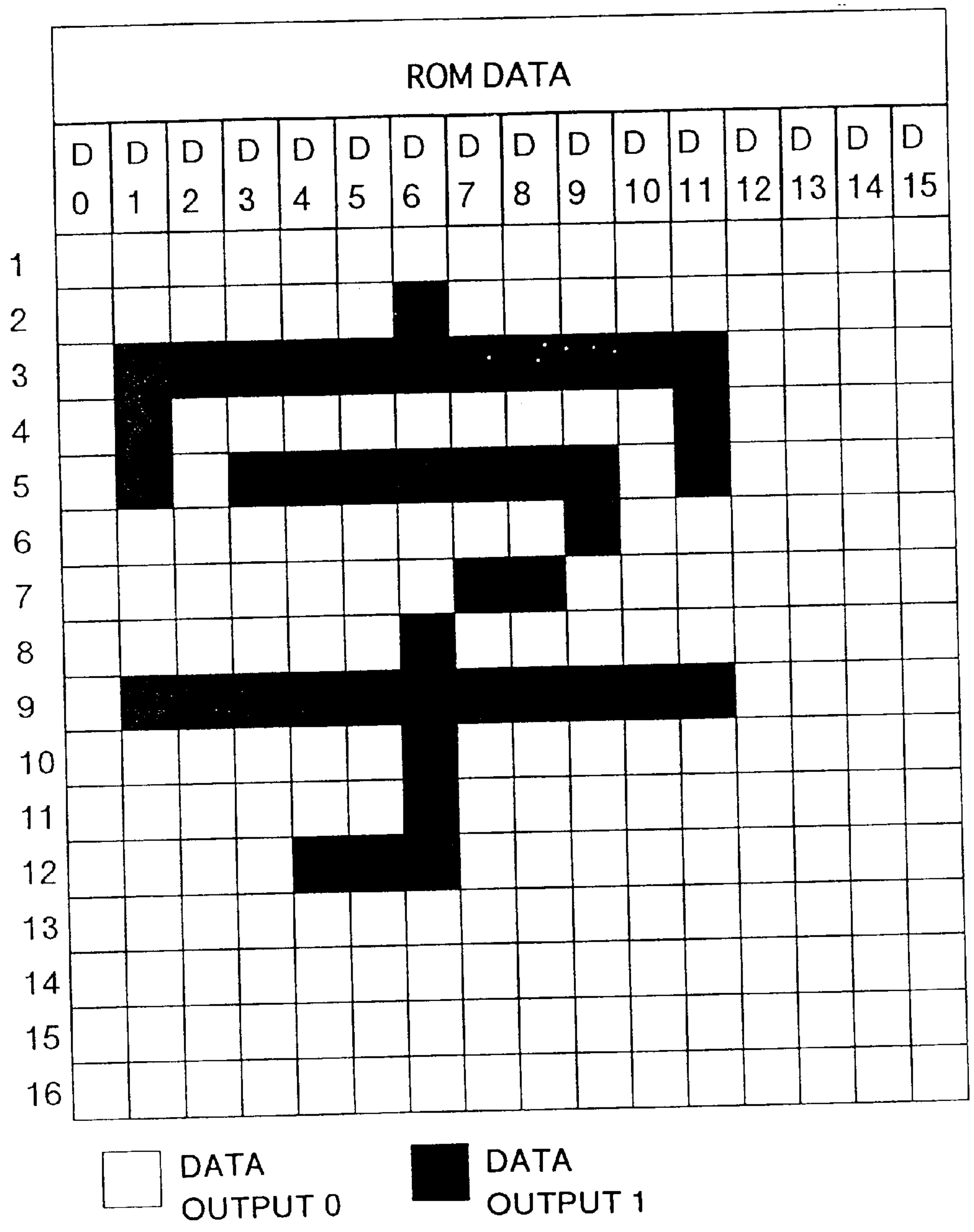
FIG.19 PRIOR ART
FIG. 19 is a diagram illustrating an example of the storage of the character font data having a 12-dot size according to the prior art.
Figure 20:
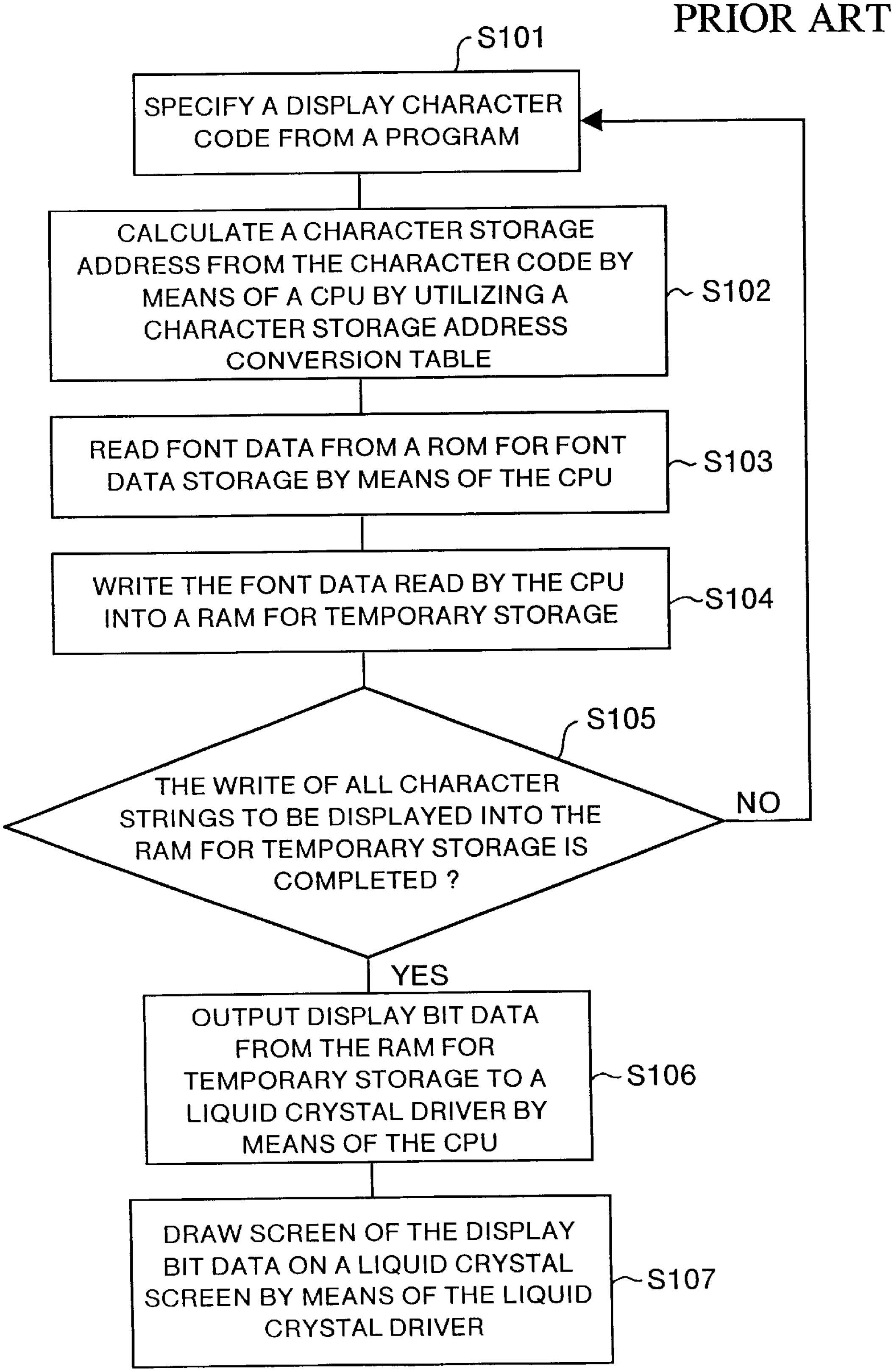
FIG.20 PRIOR ART
FIG. 20 is a flowchart showing a character display processing according to the prior art.
Figure 21:
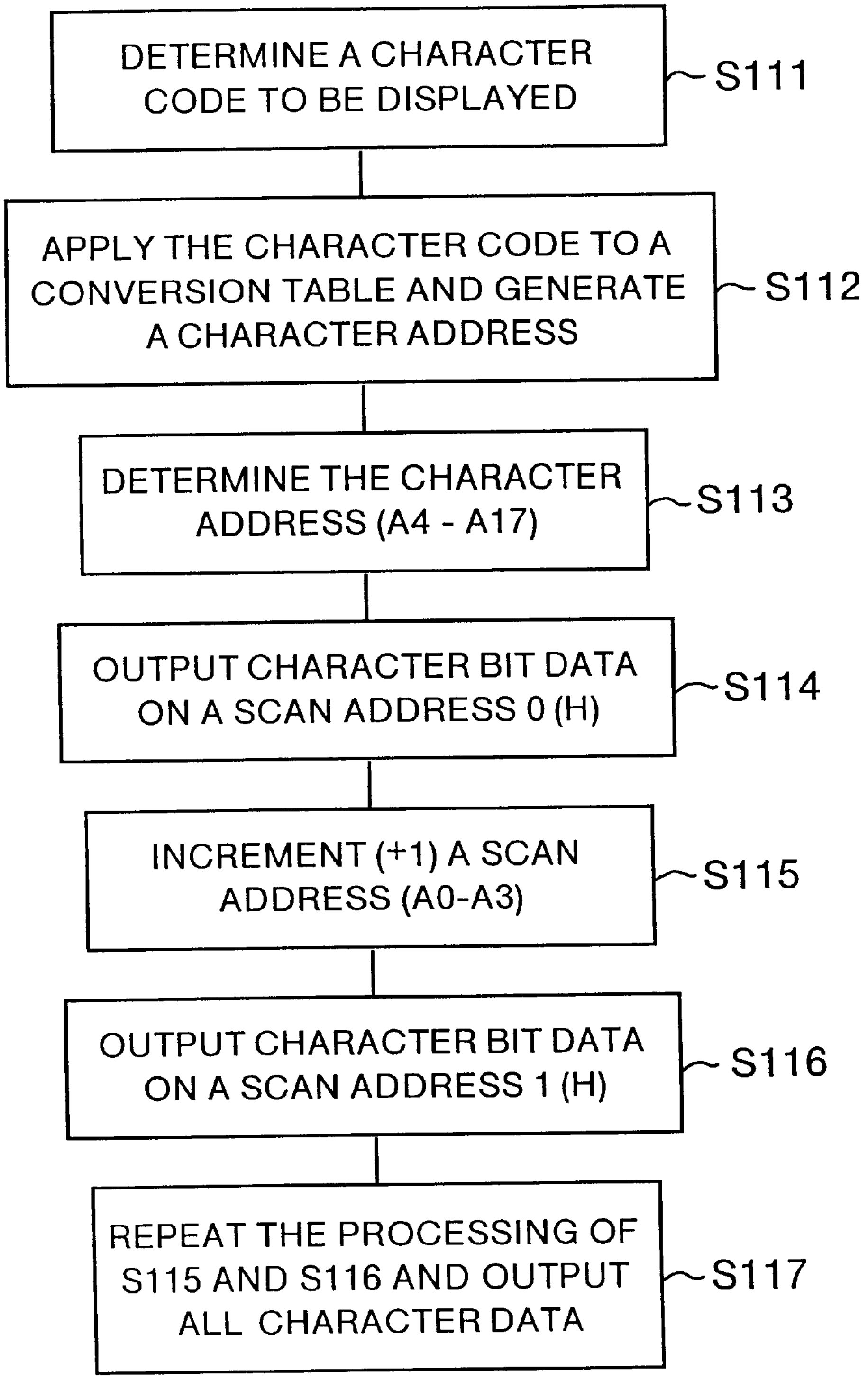
FIG.21 PRIOR ART
FIG. 21 is a flowchart for font data reading according to the prior art.
Figure 22:
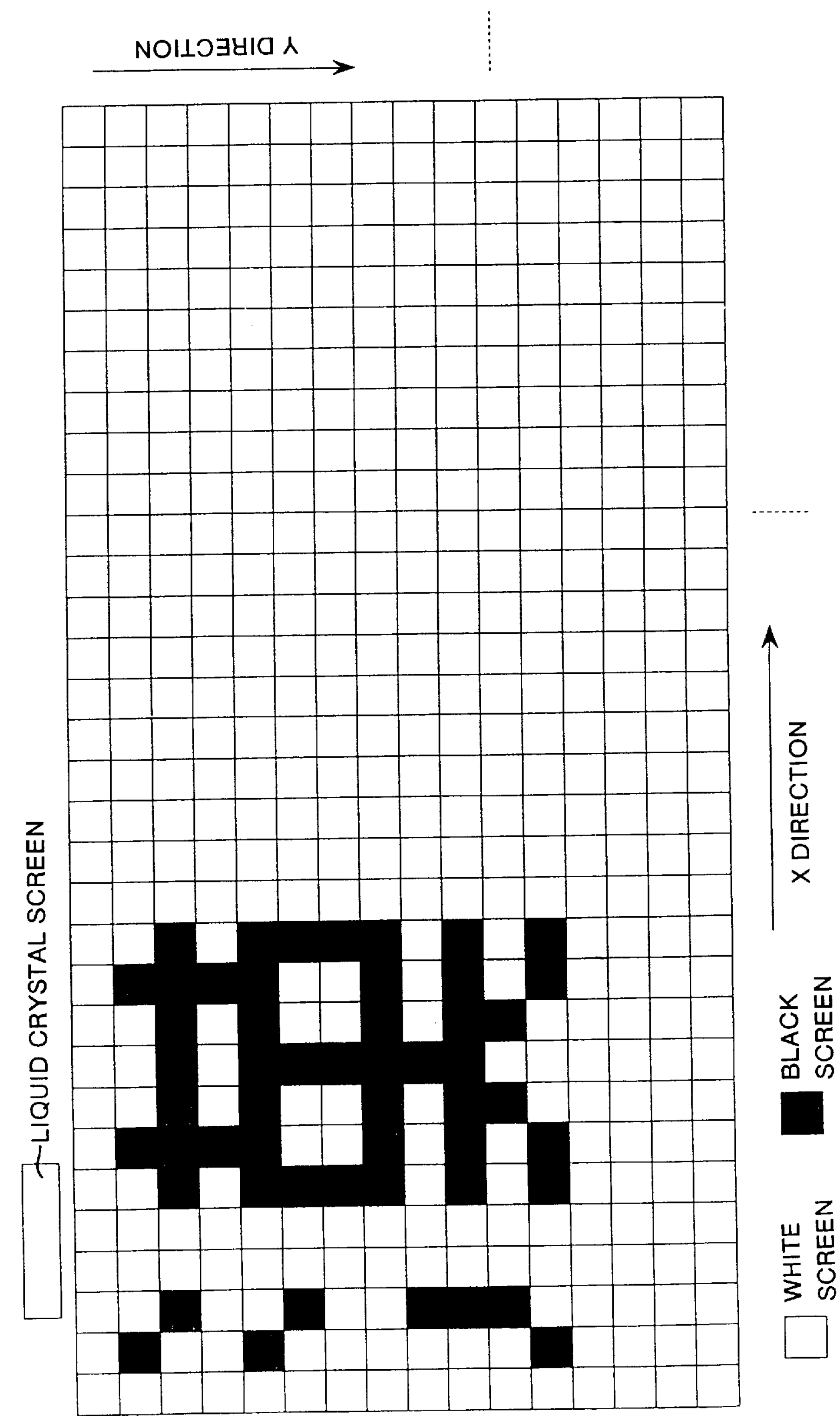
FIG.22 PRIOR ART
FIG. 22 is a diagram illustrating an example of the display of character font data of 漢 according to the prior art.
Figure 25:
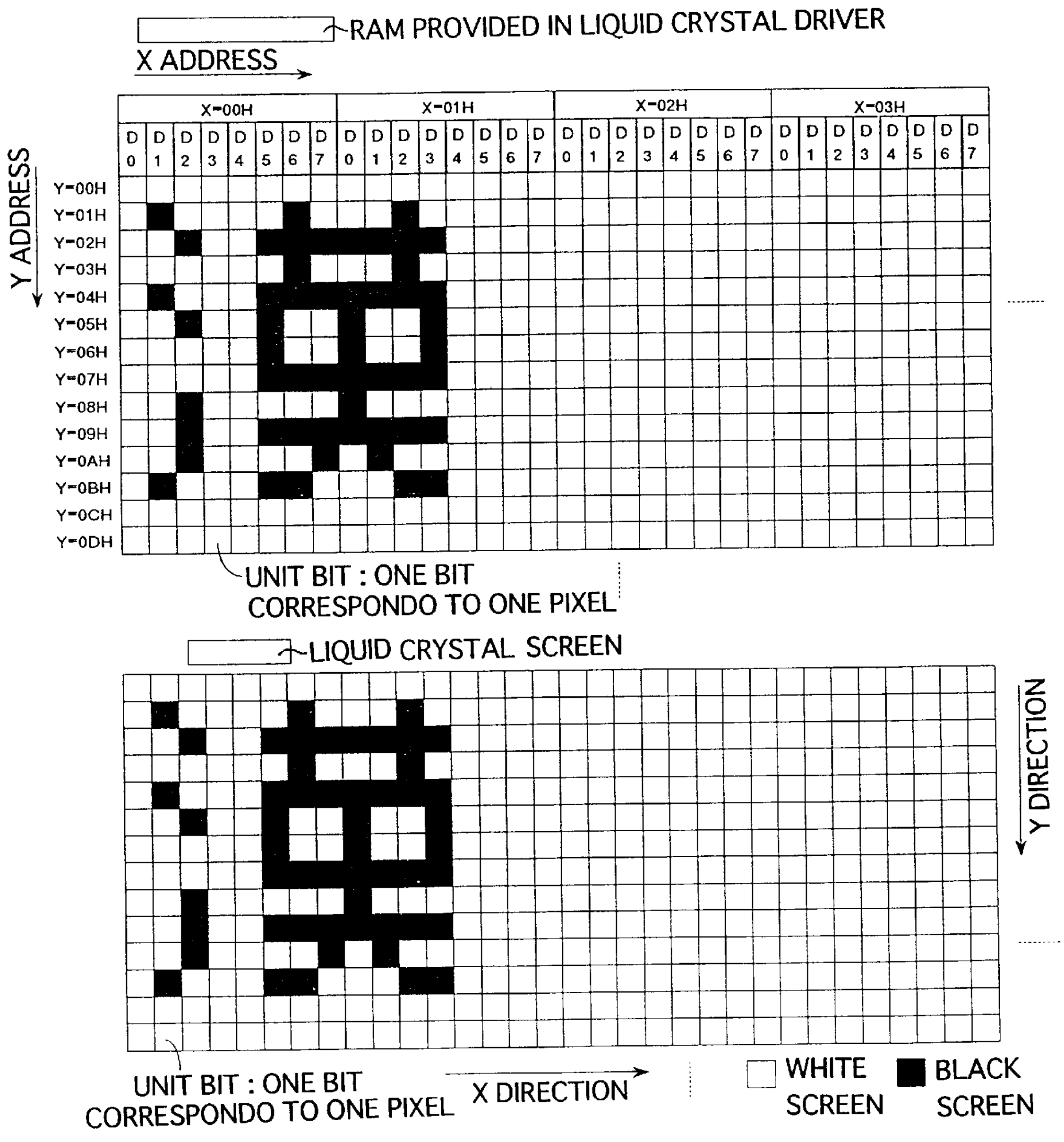
FIG.25 PRIOR ART
FIG. 25 is a diagram showing a corresponding relationship between a display on a liquid crystal display screen and a display RAM provided in a liquid crystal driving circuit.
Figure 26:
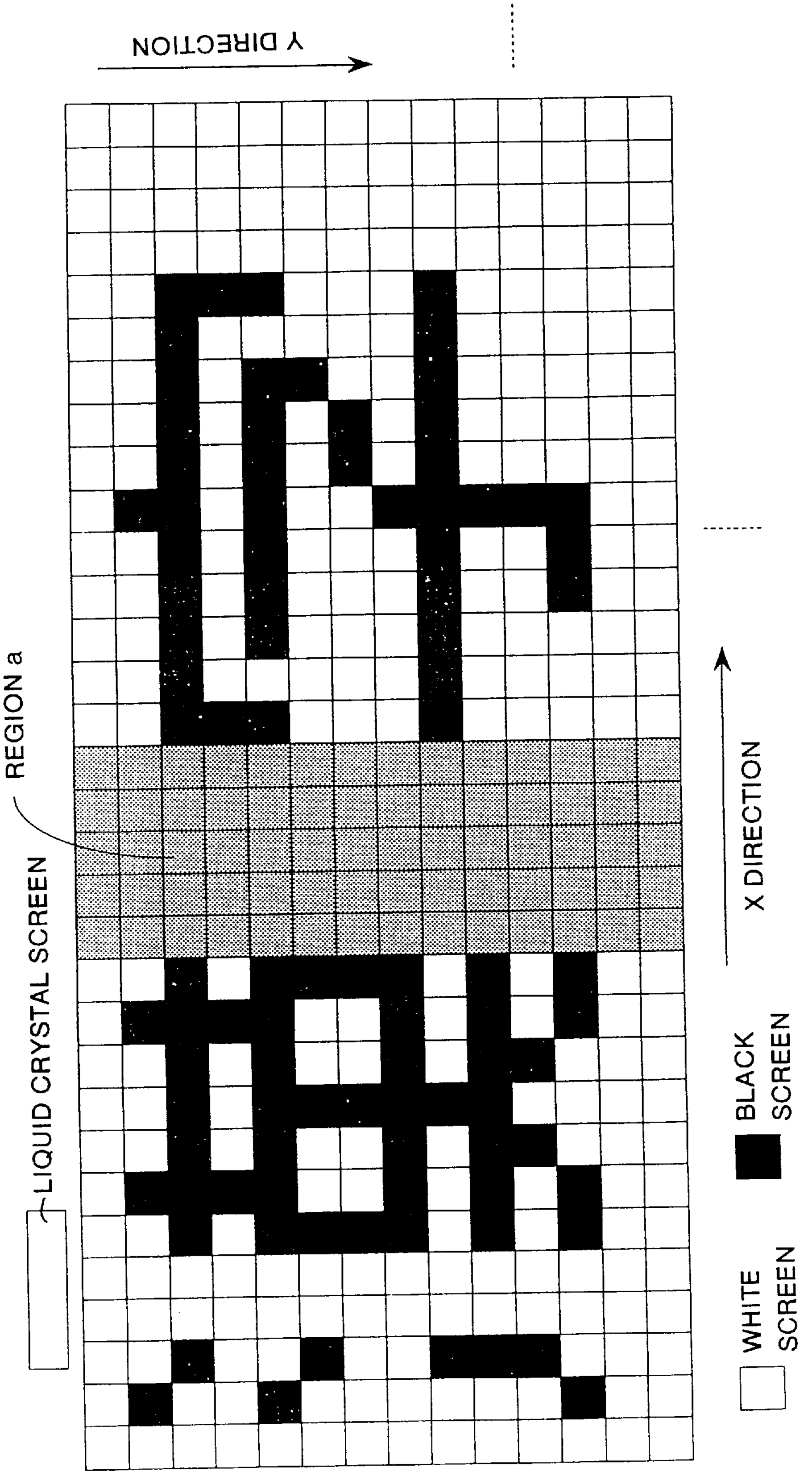
FIG.26 PRIOR ART
FIG. 26 is a diagram illustrating an example of the display on a liquid crystal display screen according to the prior art.

The storing method and the method for obtaining a head address described above can be applied to the storage of font data in a mask ROM or a flash memory in addition to the semiconductor device according to the present invention. Consequently, a memory portion can be saved for the storage of font data and a necessary capacity can be reduced. In this case, in order to take versatility with other systems, for example, a 16-bit output requires a portion "a" in FIG. 18 but a storage area in a portion b in FIG. 18 is not necessary. In the case where a program different from that shown in FIG. 8 and fonts having different sizes are to be stored together, a head address can be obtained by adding the storage head address of the font to the character head address calculated according to the present invention.

Figure 11:
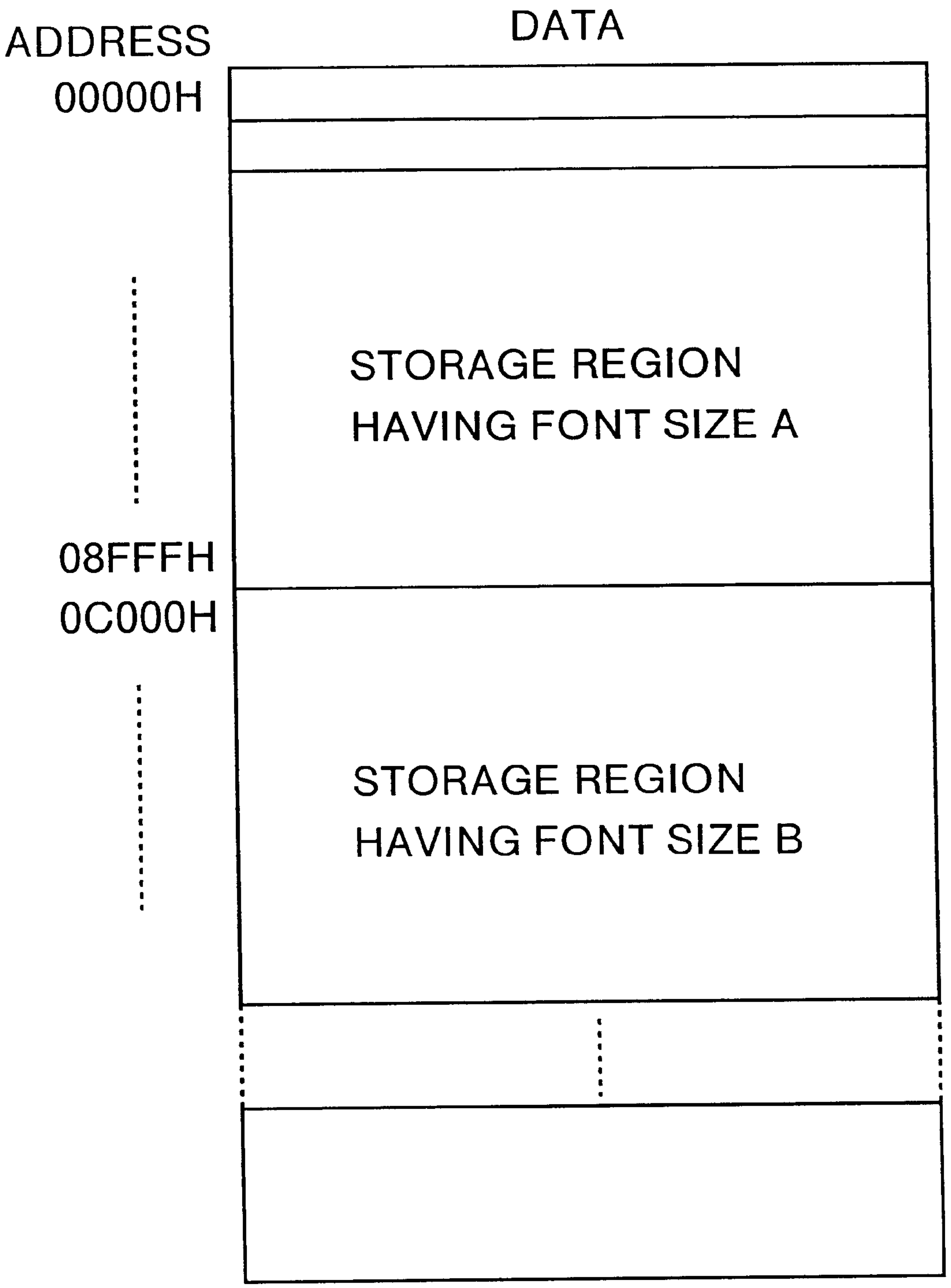
FIG. 11 is a diagram illustrating a method for storing fonts having various sizes according to the present invention.
Figure 12:
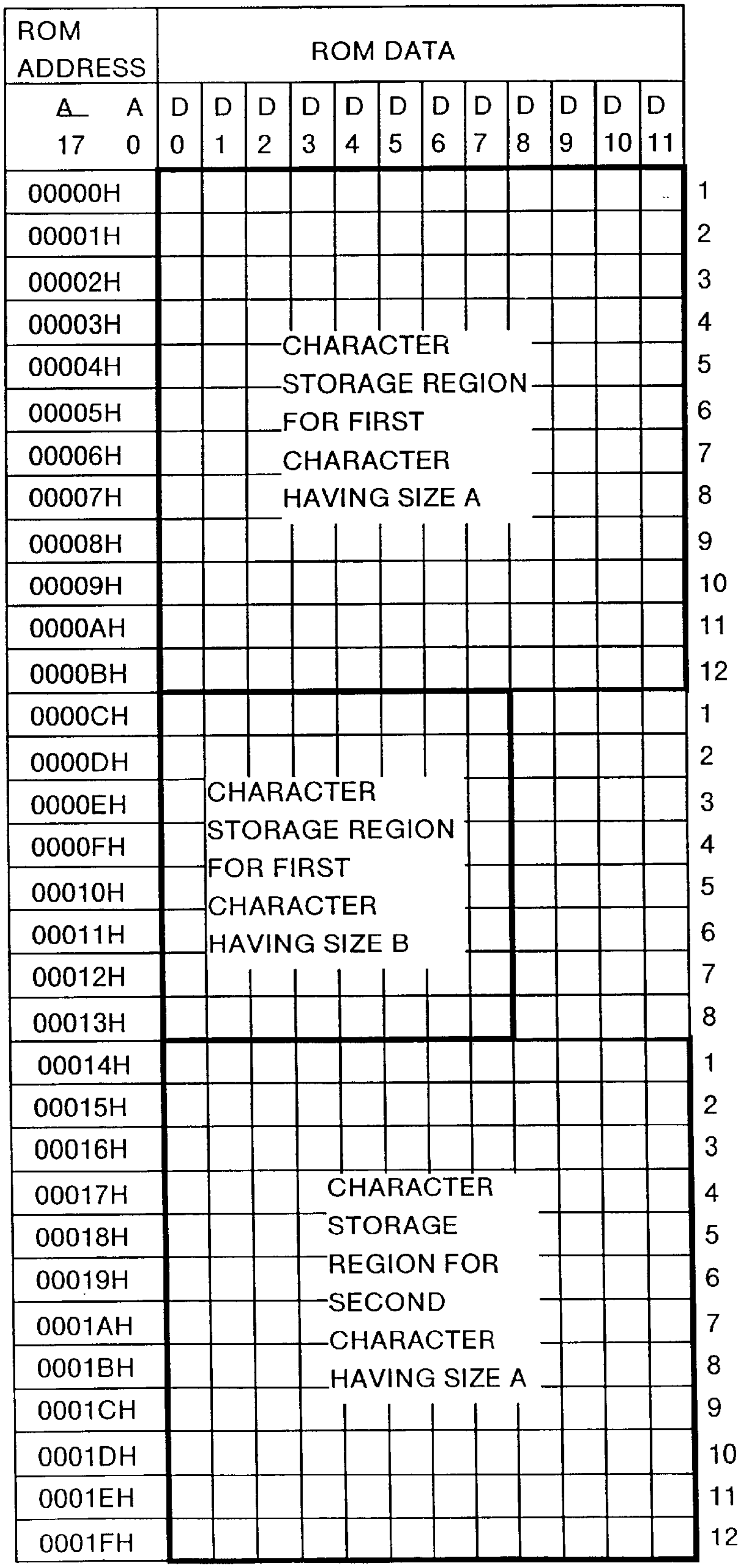
FIG. 12 is a diagram illustrating the method for storing fonts having various sizes according to the present invention.

In consideration of the storage of font data having various sizes, there are a storage method for dividing the font data into different regions for each font size as shown in FIG. 11 and a storage method for mixing fonts having various sizes in one region as shown in FIG. 12.

In the storage method shown in FIG. 11, the conversion tables as shown in FIGS. 6 and 7 are required for each font size.

For example, in the case where fonts having 12-dot and 8-dot sizes are to be stored, a character having a font size of 12-dots is stored in a portion having a size A in FIG. 11 and a character having a font size of 8 dots is stored in a portion having a size B in FIG. 11. Consequently, from FIG. 6, a head of a font storage ROM address having 12 dots is obtained by multiplying a conversion code value by 12+00000 (a hexadecimal number) and a head of a font storage ROM address having 8 dots is obtained by multiplying a conversion code value by 8+C000 (a hexadecimal number).

According to the storage method shown in FIG. 12, only one conversion table as shown in FIG. 6 is used. FIG. 12 shows the case where font data having 12-dot and 8-dot sizes are mixed and stored. In this case, the head of the font storage ROM address is obtained by multiplying a size of a conversion code value by a font character as seen in FIG. 6. Since there are two kinds of fonts having 12 dots and 8 dots, the font character has a size of 12+8=20.

Accordingly, in the case of FIG. 12, the head of the font storage ROM address having 12 dots is calculated by multiplying a conversion code value by 20+0. Moreover, the head of the font storage ROM address having 8 dots is calculated by multiplying a conversion code value by 20+0000C.

Figure 13:
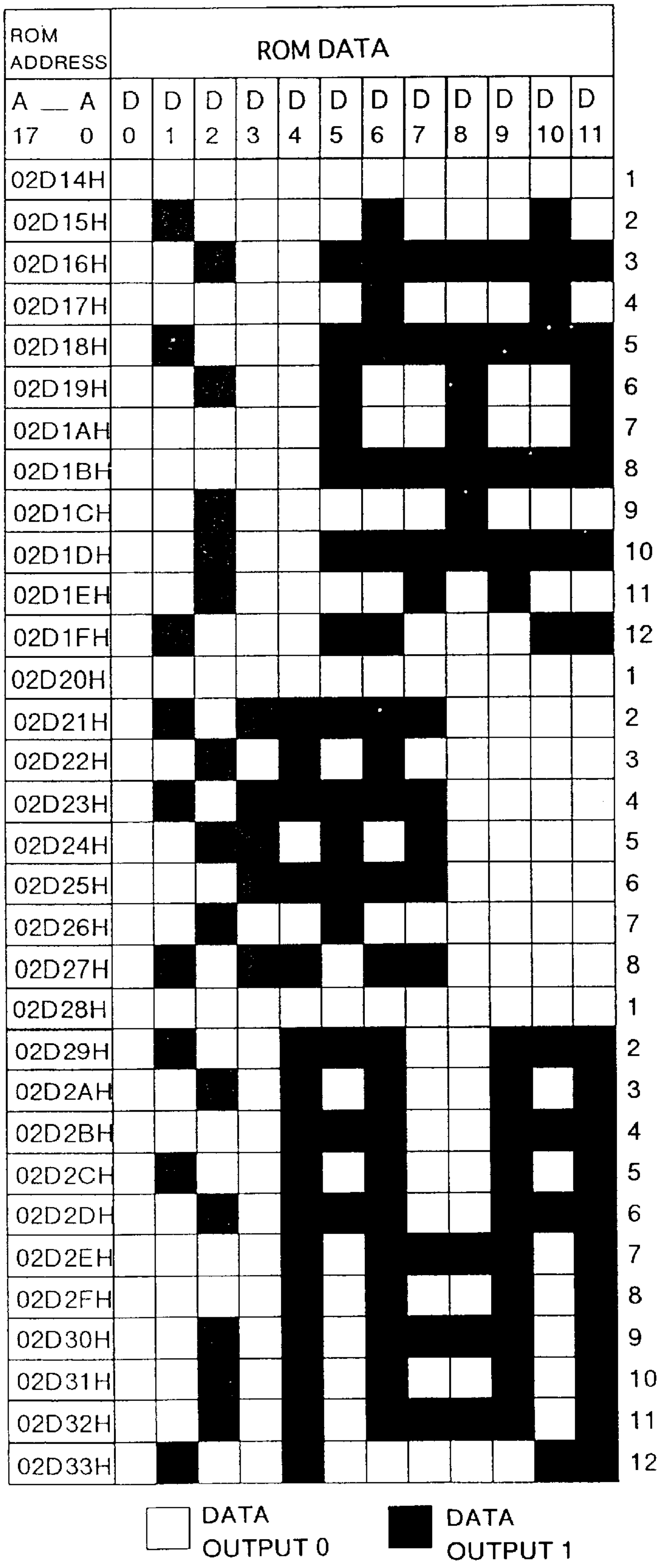
FIG. 13 is a diagram illustrating the storage image of a character font according to the present invention.

FIG. 13 shows the storage image of an actual character font corresponding to FIG. 12. While the description has been made by referring to the 12-dot and 8-dot sizes, the head of the ROM address of a character having other dot numbers can be obtained by the same method.

Furthermore, in the case where font data having a plurality of sizes are to be stored, it is preferable that the ROM 14 for font data storage should have an output bit number which is coincident with the dot number of a maximum size of the stored data. For example, in the case where fonts having 8-dot, 12-dot and 16-dot sizes are to be stored, the output bit number of the ROM 14 for font data storage is set to 16 which is equal to the maximum dot number.

According to the present invention, the first address generating section and the second address generating section are provided and the font data on a character to be displayed can be generated and expanded based on the display information given to the semiconductor device. Consequently, the load on the CPU can be reduced and a program for a display processing can be simplified.

Furthermore, the display information is given as command information. Therefore, a plurality of character codes can be input collectively and the load on the CPU can be reduced.

Moreover, the first address group corresponding to the received character code is generated by using a predetermined conversion rule. Consequently, the memory capacity of the font data storing section for storing font data can be decreased and the chip size of the semiconductor device itself can be reduced.

Furthermore, the font data expanding section is constituted by a plurality of RAMs, and the font data is separated on a time-sharing basis and is read and written from and into the RAMs. Consequently, it is possible to get a margin for the reading and writing speeds for the RAMs.

What is claimed is:

1. A semiconductor device for display control comprising:

an input section for receiving a display information including a character code, a display position information and a character size information;

a first address generating section for generating a first address group corresponding to the received character code by applying a predetermined conversion rule to the received character code and character size information;

a font data storing section for prestoring font data corresponding to the character data in a region specified by the first address group and outputting the font data stored in the region specified by the first address group when the first address group is given;

a second address generating section for generating a second address group by utilizing the received display position information, the second address group representing a region where the font data output from the font data storing section is to be expanded;

a font data expanding section for expanding and temporarily storing the font data output from the font data storing section in the region represented by the second address group generated by the second address generating section; and an output section for outputting the font data stored in the font data expanding section to an external display driving unit.

2. A semiconductor device for display control according to claim 1, wherein the display information received by the input section is a command information having an identifier for identifying a character code, a display position information and a character size information.

3. A semiconductor device for display control according to claim 1, wherein the first address group generated by the first address generating section comprises a head address of font data stored in the font data storing section and a number of addresses succeeding the head address, the number corresponding to the character size information, and the head address is calculated as a product of a conversion code value obtained by converting the character code in accordance with the predetermined conversion rule and the character size information.

4. A semiconductor device for display control according to claim 3, wherein the first address generating section includes a first serial counter for sequentially incrementing from the head address to an address which is the number corresponding to the character size information plus the head address, thereby to generate the address.

5. A semiconductor device for display control according to claim 1, wherein plural pieces of display information received by the input section comprise a start command indicative of the head of the plural pieces of display information, a character command containing a plurality of character codes, the display position information of each character code and the character size information of each character code, and an end command indicative of the end of the display information.

6. A semiconductor device for display control according to claim 5, wherein the second address group generated by the second address generating section comprises a head address obtained from the received display position information and a number of addresses following the head address, the number corresponding to the number of character codes contained in the character command received by the input section, and the second address generating section includes a second serial counter for sequentially incrementing from the head address to an address which is the number corresponding to the number of character codes plus the head address, thereby to generate the address.

7. A semiconductor device for display control according to claim 6, wherein the font data expanding section comprises a plurality of RAMs and the second address generating section includes a RAM address converting section for sequentially distributing the address generated by increment by means of the second serial counter to each of the RAMs and outputting the address to each of the RAMs in a predetermined timing when font data is to be written into or read from the font data expanding section.

8. A semiconductor device for display control according to claim 1, wherein the font data expanding section comprises a plurality of RAMs and the font data output from the font data storing section is separated on a time sharing basis and is written into and read from the RAMs.

9. A display control device comprising:

a CPU;

a semiconductor device for display control as set forth in claim 1; and a liquid crystal driving device, wherein the CPU gives the display information to the semiconductor device for display control and an output section of the semiconductor device for display control gives the font data to the liquid crystal driving device.

* * * * *